(12) United States Patent
Whitelaw et al.

(10) Patent No.: US 12,444,278 B2
(45) Date of Patent: Oct. 14, 2025

(54) CHECKOUT TERMINAL

(71) Applicant: Walmart Apollo, LLC, Bentonville, AR (US)

(72) Inventors: Darrell Whitelaw, Pacific Palisades, CA (US); Andrew J. Grignon, Roseville, CA (US); Kristine L. Pachuta, Brooklyn, NY (US); Michael C. Cervantes, San Francisco, CA (US); Jae Y. Lew, Mill Valley, CA (US); Stephen S. Hadinger, Berkeley, CA (US); Brittany N. Leek, Waterford, MI (US); William J. Yergin, San Jose, CA (US); Wei-Meng Chee, Belmont, CA (US); John C. Crecelius, Jr., Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/696,303

(22) PCT Filed: Sep. 22, 2022

(86) PCT No.: PCT/US2022/044365
§ 371 (c)(1),
(2) Date: Mar. 27, 2024

(87) PCT Pub. No.: WO2023/049250
PCT Pub. Date: Mar. 30, 2023

(65) Prior Publication Data
US 2025/0046161 A1    Feb. 6, 2025

Related U.S. Application Data

(60) Provisional application No. 63/310,001, filed on Feb. 14, 2022, provisional application No. 63/248,905, filed on Sep. 27, 2021.

(51) Int. Cl.
*G07G 1/00* (2006.01)
*G06T 7/50* (2017.01)
(Continued)

(52) U.S. Cl.
CPC ............. *G07G 1/0072* (2013.01); *G06T 7/50* (2017.01); *G06V 10/141* (2022.01); *G06V 10/82* (2022.01);
(Continued)

(58) Field of Classification Search
CPC ........ G07G 1/0072; G07G 1/009; G07G 1/01; G06T 7/50; G06T 2207/10028;
(Continued)

(56) References Cited

U.S. PATENT DOCUMENTS

| 5,083,638 A | 1/1992 | Schneider |
| 5,115,888 A | 5/1992 | Schneider |

(Continued)

FOREIGN PATENT DOCUMENTS

| CA | 2868192 A1 | 9/2013 |
| CN | 104217324 A | 12/2014 |

(Continued)

OTHER PUBLICATIONS

BBC, The unpopular rise of self-checkouts (and how to fix them), available in bbc.com, date published May 9, 2017 [online], [site visited Sep. 16, 2023], Available from the internet URL: https://www.bbc.com/future/article/20170509-the-unpopular-rise-of-self-checkouts-and-how-to-fix-them (Year: 2017).

(Continued)

*Primary Examiner* — Daniel A Hess
(74) *Attorney, Agent, or Firm* — Fitch, Even, Tabin & Flannery LLP

(57) ABSTRACT

A checkout terminal is provided. The checkout terminal comprises a camera array, a display device, a weight scale, (Continued)

and a control circuit. The control circuit is configured to identify, based at least on images captured by the camera array, product identifiers associated with a plurality of different items placed in a placement area and on the weight scale, determine a combined weight of the plurality of different items based on product weight information stored in a product database, retrieve a weight measurement measured by the weight scale, detect for unaccounted items based on comparing the combined weight the plurality of different items and the weight measurement, and in the event that an unaccounted item is detected, display, via the display device, instructions to move one or more items to identify the unaccounted item.

20 Claims, 18 Drawing Sheets

(51) Int. Cl.
    *G06V 10/141* (2022.01)
    *G06V 10/82* (2022.01)
    *G07G 1/01* (2006.01)
(52) U.S. Cl.
    CPC .............. *G07G 1/009* (2013.01); *G07G 1/01* (2013.01); *G06T 2207/10028* (2013.01); *G06T 2207/20081* (2013.01); *G06T 2207/20084* (2013.01)
(58) Field of Classification Search
    CPC   G06T 2207/20081; G06T 2207/20084; G06V 10/141; G06V 10/82
    USPC ......................................................... 235/383
    See application file for complete search history.

(56)             References Cited

U.S. PATENT DOCUMENTS

| | | |
|---|---|---|
| 5,804,807 A | 9/1998 | Murrah |
| 6,598,791 B2 | 7/2003 | Bellis, Jr. |
| 6,672,506 B2 | 1/2004 | Swartz |
| 6,854,647 B2 | 2/2005 | Collins, Jr. |
| 7,114,656 B1 | 10/2006 | Garver |
| D536,192 S | 2/2007 | Kruse |
| 7,219,838 B2 | 5/2007 | Brewster |
| 7,337,955 B1 | 3/2008 | Block |
| 7,413,122 B2 | 8/2008 | Murofushi |
| 7,648,068 B2 | 1/2010 | Silverbrook |
| 7,780,081 B1 | 8/2010 | Liang |
| 7,954,719 B2 | 6/2011 | Zhu |
| 8,033,461 B2 | 10/2011 | Barron |
| 8,196,822 B2 | 6/2012 | Goncalves |
| 8,448,859 B2 | 5/2013 | Goncalves |
| 8,620,755 B1 | 12/2013 | Argue |
| 8,635,112 B1 | 1/2014 | Argue |
| 8,746,557 B2 | 6/2014 | Connell, II |
| 8,942,996 B2 | 1/2015 | Argue |
| D724,365 S | 3/2015 | Demars |
| 9,171,442 B2 | 10/2015 | Clements |
| 9,262,781 B2 | 2/2016 | Mackinnon Keith |
| 9,311,645 B2 | 4/2016 | Edwards |
| 9,347,819 B2 | 5/2016 | Atwater |
| 9,552,710 B2 | 1/2017 | Rasband |
| D787,869 S | 5/2017 | Denby |
| 9,747,759 B2 | 8/2017 | Klein |
| 9,892,438 B1 | 2/2018 | Kundu |
| 9,911,138 B2 | 3/2018 | Grabovski |
| 9,953,355 B2 | 4/2018 | Liu |
| D828,348 S | 9/2018 | Lee |
| 10,121,133 B2 | 11/2018 | Nelms |
| 10,448,761 B2 | 10/2019 | Bacallao |
| 10,540,551 B2 | 1/2020 | Srivastava |
| 10,592,944 B2 | 3/2020 | Kundu |
| 10,672,051 B2 | 6/2020 | Herring |
| 10,872,326 B2 | 12/2020 | Garner |
| D917,942 S | 5/2021 | Crecelius |
| 11,017,229 B2 | 5/2021 | Magee |
| 11,208,134 B2 | 12/2021 | Carter |
| 11,244,543 B2 | 2/2022 | Makley |
| 11,263,682 B2 | 3/2022 | Karmakar |
| 11,308,297 B2 | 4/2022 | Gao |
| D970,147 S | 11/2022 | Tougo |
| D981,394 S | 3/2023 | Pollmann |
| D982,001 S | 3/2023 | Pollmann |
| D1,007,208 S | 12/2023 | Mcdowell |
| 11,966,900 B2 | 4/2024 | Xiao |
| D1,026,516 S | 5/2024 | Johnson |
| D1,047,548 S | 10/2024 | Whitelaw |
| D1,051,647 S | 11/2024 | Whitelaw |
| 2003/0018897 A1 | 1/2003 | Donald |
| 2004/0041021 A1 | 3/2004 | Nugent |
| 2004/0220860 A1 | 11/2004 | Persky |
| 2005/0006176 A1 | 1/2005 | Kurtz |
| 2005/0189411 A1 | 9/2005 | Ostrowski |
| 2006/0032914 A1 | 2/2006 | Brewster |
| 2007/0063045 A1 | 3/2007 | Acosta |
| 2007/0080220 A1 | 4/2007 | Garver |
| 2007/0125849 A1 | 6/2007 | Addison |
| 2008/0041959 A1 | 2/2008 | Knowles |
| 2009/0192902 A1 | 7/2009 | Cox |
| 2009/0321518 A1 | 12/2009 | Barron |
| 2010/0053329 A1 | 3/2010 | Flickner |
| 2010/0191603 A1 | 7/2010 | Herwig |
| 2012/0041845 A1 | 2/2012 | Rothschild |
| 2012/0055982 A1 | 3/2012 | Edwards |
| 2012/0095853 A1 | 4/2012 | Von Bose |
| 2012/0173351 A1 | 7/2012 | Hanson |
| 2012/0320214 A1 | 12/2012 | Kundu |
| 2013/0018741 A1 | 1/2013 | Ostrowski |
| 2013/0254044 A1 | 9/2013 | Catoe |
| 2013/0278425 A1 | 10/2013 | Cunningham |
| 2014/0052555 A1 | 2/2014 | Macintosh |
| 2014/0067568 A1 | 3/2014 | Argue |
| 2014/0211017 A1 | 7/2014 | Argue |
| 2014/0214596 A1 | 7/2014 | Acker, Jr. |
| 2014/0316901 A1 | 10/2014 | Grabovski |
| 2015/0009035 A1 | 1/2015 | Rasband |
| 2017/0046707 A1 | 2/2017 | Krause |
| 2017/0083887 A1 | 3/2017 | Volta |
| 2017/0132601 A1 | 5/2017 | Susaki |
| 2017/0161703 A1 | 6/2017 | Dodia |
| 2017/0323253 A1 | 11/2017 | Enssle |
| 2018/0232796 A1 | 8/2018 | Glaser |
| 2018/0247292 A1 | 8/2018 | Crooks |
| 2018/0314863 A1 | 11/2018 | Gao |
| 2018/0330196 A1 | 11/2018 | Chaubard |
| 2019/0034897 A1 | 1/2019 | Gao |
| 2019/0043057 A1 | 2/2019 | Montgomery |
| 2019/0080277 A1 | 3/2019 | Trivelpiece |
| 2019/0108396 A1 | 4/2019 | Dal Mutto |
| 2019/0188435 A1 | 6/2019 | Davis |
| 2019/0333039 A1 | 10/2019 | Glaser |
| 2019/0355049 A1 | 11/2019 | Kulkarni Wadhonkar |
| 2020/0079412 A1 | 3/2020 | Ramanathan |
| 2020/0193507 A1 | 6/2020 | Glaser |
| 2020/0380226 A1 | 12/2020 | Rodriguez |
| 2021/0019725 A1 | 1/2021 | Xiao |
| 2021/0150618 A1 | 5/2021 | Glaser |
| 2021/0183211 A1 | 6/2021 | Suzuki |
| 2022/0044221 A1 | 2/2022 | Ueki |
| 2022/0194454 A1 | 6/2022 | Carter |
| 2022/0270065 A1 | 8/2022 | Barkan |
| 2022/0383383 A1 | 12/2022 | Xiao |
| 2022/0414924 A1 | 12/2022 | Krishnamurthy |
| 2023/0027855 A1 | 1/2023 | Dheeraj Raju |
| 2023/0245535 A1 | 8/2023 | Zhichun |
| 2023/0259944 A1 | 8/2023 | Gotanda |
| 2023/0410041 A1* | 12/2023 | Roth .................... G06Q 20/208 |

(56) References Cited

U.S. PATENT DOCUMENTS

FOREIGN PATENT DOCUMENTS

| | | |
|---|---|---|
| CN | 107228706 | 10/2017 |
| CN | 207731310 U | 8/2018 |
| CN | 209357183 | 9/2019 |
| CN | 306368800 | 2/2021 |
| CN | 306315473 | 3/2021 |
| EP | 3514772 | 7/2019 |
| EP | 3865017 | 8/2021 |
| WO | 2015051303 A1 | 4/2015 |
| WO | 2015112446 | 7/2015 |
| WO | 2019062018 A1 | 4/2019 |
| WO | 2021097019 | 5/2021 |
| WO | 2021097019 A1 | 5/2021 |
| WO | 2022082309 | 4/2022 |
| WO | 2022190101 | 9/2022 |
| WO | 20220190101 | 9/2022 |
| WO | 2023049250 | 3/2023 |
| WO | 2024163396 | 8/2024 |
| WO | 2024163470 | 8/2024 |
| WO | 2024163480 | 8/2024 |

OTHER PUBLICATIONS

CCL, SCO With Age Recognition, available in colpos.com, google date May 26, 2013 [online], [site visited Sep. 22, 2023], Available from the internet URL: https://www.cclpos.com/self-checkout/self-checkout-facial-recognition.html (Year: 2013).

Licca Ch Liang, Smart Self Service Checkout Solution, available in Youtube.com, published Apr. 14, 2019, [online], [site visited Sep. 22, 2023], Available from the internet URL: https://www.youtube.com/watch?v=b0K6L9Q00Mo (Year: 2019).

Medium, Why Self-Service Checkouts Suck, available in medium.com, date published Jan. 25, 2017 [online], [site visited Sep. 18, 2023], Available from the internet URL: https://medium.com/the-ux-chap/why-self-service-checkouts-suck-276b2b73a389 (Year: 2017).

PCT; App. No. PCT/US2022/044365; International Preliminary Report on Patentability mailed Apr. 11, 2024; (7 pages).

PCT; App. No. PCT/US2022/044365; International Search Report and Written Opinion mailed Dec. 28, 2022; (7 pages).

Penny Pincher, First, Walmart Moved Entirely to Self-Checkout. Now Here's What's Happening Next ?? , available in passionatepennypincher.com, date published Mar. 16, 2022 [online], [site visited Sep. 16, 2023], Available from the internet URL: https://passionatepennypincher.com/walmart-self-checkout/ (Year: 2022).

Smith, New Checkout Experience Seeks to Eliminate the Wait and Add Options at the Register, available in corporate.walmart.com, date published Jun. 30, 2020 [online], [site visited Sep. 22, 2023], Available from the internet URL: https://corporate.walmart.com/news/2020/06/30/new-checkout-experience-seeks-to-e (Year: 2020).

The Conversation, Why technology makes us dishonest: ways to reduce cheating at self-service checkouts, available in theconversation.com, date published Aug. 7, 2016 [online], [site visited Sep. 18, 2023], Available from the internet URL: https://theconversation.com/why-technology-makes-us-dishonest-ways-to-r (Year: 2016).

The Spoon, The Spoon checks out Mashgin's AI-Powered Checkout at CES 2022, available in Youtube.com, published Jan. 8, 2022 [online], [site visited Sep. 22, 2023], Available from the internet URL: https://www.youtube.com/watch?v=P9XmUxSO-UO (Year: 2022).

Bobbit, Russell et al.; "Visual Item Verification for Fraud Prevention in Retail Self-Checkout"; 2011 IEEE Workshop on Applications of Computer Vision (WACV); 2011; Kona, HI, USA; <https://ieeexplore.ieee.org/document/5711557>; pp. 1-6.

Bobbit, Russell, et al.; "Visual Item Verification for Fraud Prevention in Retail Self-Checkout"; IBM T.J. Watson Research ; 2011; pp. 1-6.

Datalogic ADC Inc; "Magellan™ 8300/8400#"; Product Reference Guide; 2016; Datalogic S.p.A .; Eugene, OR, USA; < https://www.mercator.eu/mercator/std/pos/Manual_Datalogic_Magella_8400.pdf>; 542 pages.

Keonn Technologies S.L; "AdvanGo Self-checkout RFID modular system"; <https://keonn.com/wp-content/uploads/Keonn-AdvanGo-Data-sheet.pdf>; pp. 1-7.

PCT; App No. PCT/US2020/60120; International Search Report and Written Opinion mailed Mar. 12, 2021; (13 pages).

U.S. Appl. No. 16/931,076; Office Action mailed Oct. 5, 2021; (pp. 1-18).

U.S. Appl. No. 16/931,076; Final Rejection mailed Feb. 17, 2022; (pp. 1-19).

U.S. Appl. No. 16/931,076; Final Rejection mailed Dec. 27, 2022; (pp. 1-21).

U.S. Appl. No. 16/931,076; Non-Final Rejection mailed Jul. 19, 2023; (pp. 1-25).

U.S. Appl. No. 16/931,076; Non-Final Rejection mailed Sep. 2, 2022; (pp. 1-22).

U.S. Appl. No. 17/775,414; Non-Final Rejection mailed Apr. 21, 2023; (pp. 1-36).

U.S. Appl. No. 17/775,414; Final Rejection mailed Nov. 8, 2023; (pp. 1-25).

Venkatraman, Santhi, et al.; "i-Shopping with Sensor Fusion for finding Customer Behavior using Deep Learning Algorithm"; 2018 4th International Conference for Convergence in Technology (I2CT); Oct. 1, 2018; <http://dx.doi.org/10.1109/I2CT42659.2018.9058212>; pp. 1-7.

Weighing Solutions & Instrumentation; "RFID Weighing Scales"; <wsi-scales.com/index.php/rfid-weighing-scales/>; Feb. 10, 2023; pp. 1-3.

* cited by examiner

CHECKOUT TERMINAL

CROSS-REFERENCE TO RELATED APPLICATIONS

This application is a U.S. national stage application of the International Application No. PCT/US2022/044365, filed Sep. 22, 2022, designating the United States, which claims the benefit of U.S. Provisional Application No. 63/310,001, filed Feb. 14, 2022, and U.S. Provisional Application No. 63/248,905, filed Sep. 27, 2021, all of which are incorporated herein by reference in their entirety.

TECHNICAL FIELD

These teachings relate generally to a checkout terminal in a retail environment.

BACKGROUND

A checkout terminal is typically the point of sale (POS) of a retail store where a retail transaction is completed. At the point of sale, the merchant calculates the amount owed by the customer, indicates that amount, may prepare an invoice for the customer, and indicates the options for the customer to make payment. It is also typically the point at which a customer makes a payment to the merchant in exchange for goods or after provision of a service.

BRIEF DESCRIPTION OF THE DRAWINGS

Disclosed herein are embodiments of systems and methods for a checkout terminal for retail transactions. This description includes drawings, wherein.

Figure 1:
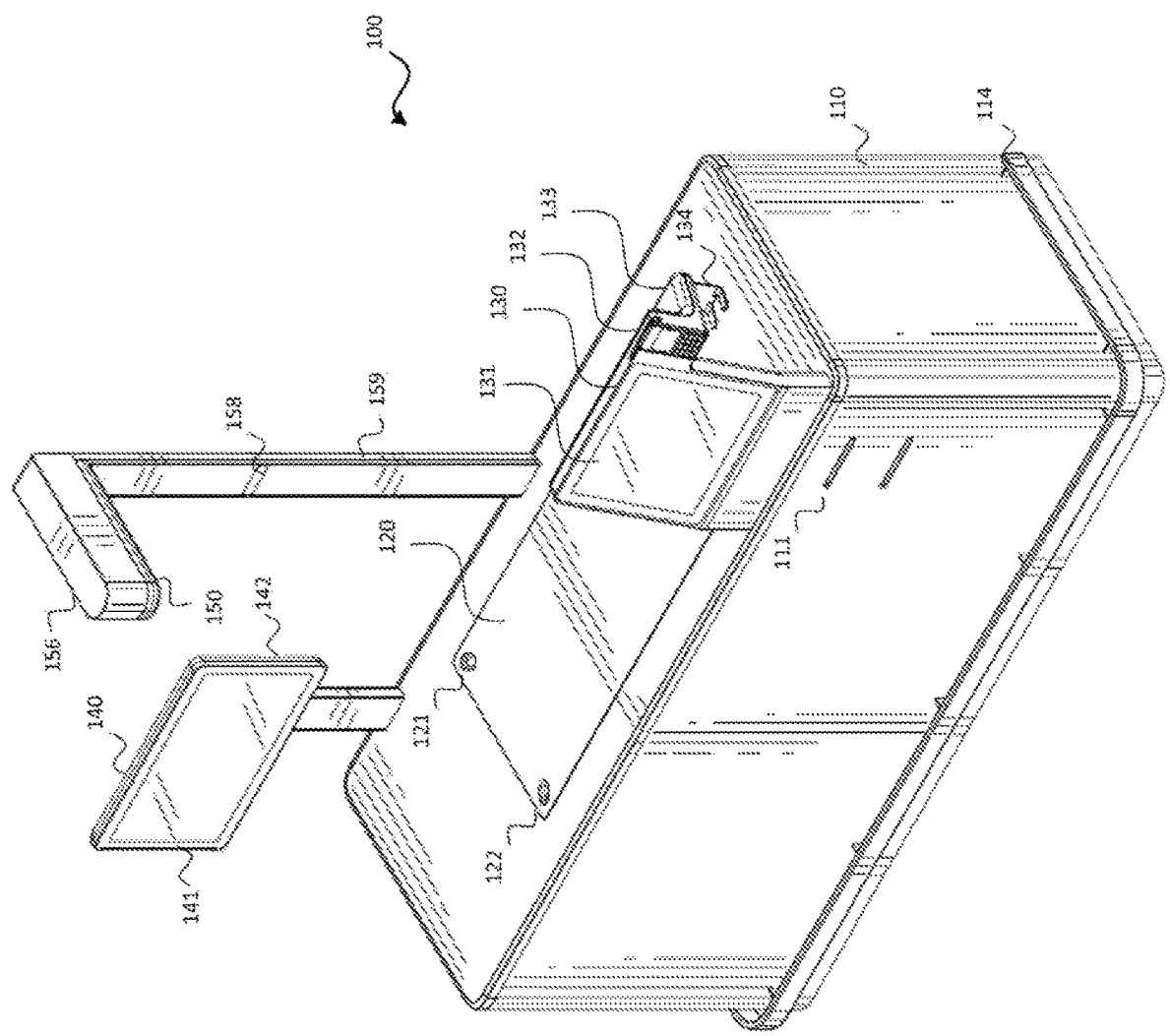
FIG. 1 is an illustration of a checkout terminal in a top front perspective view in accordance with some embodiments.
Figure 2:
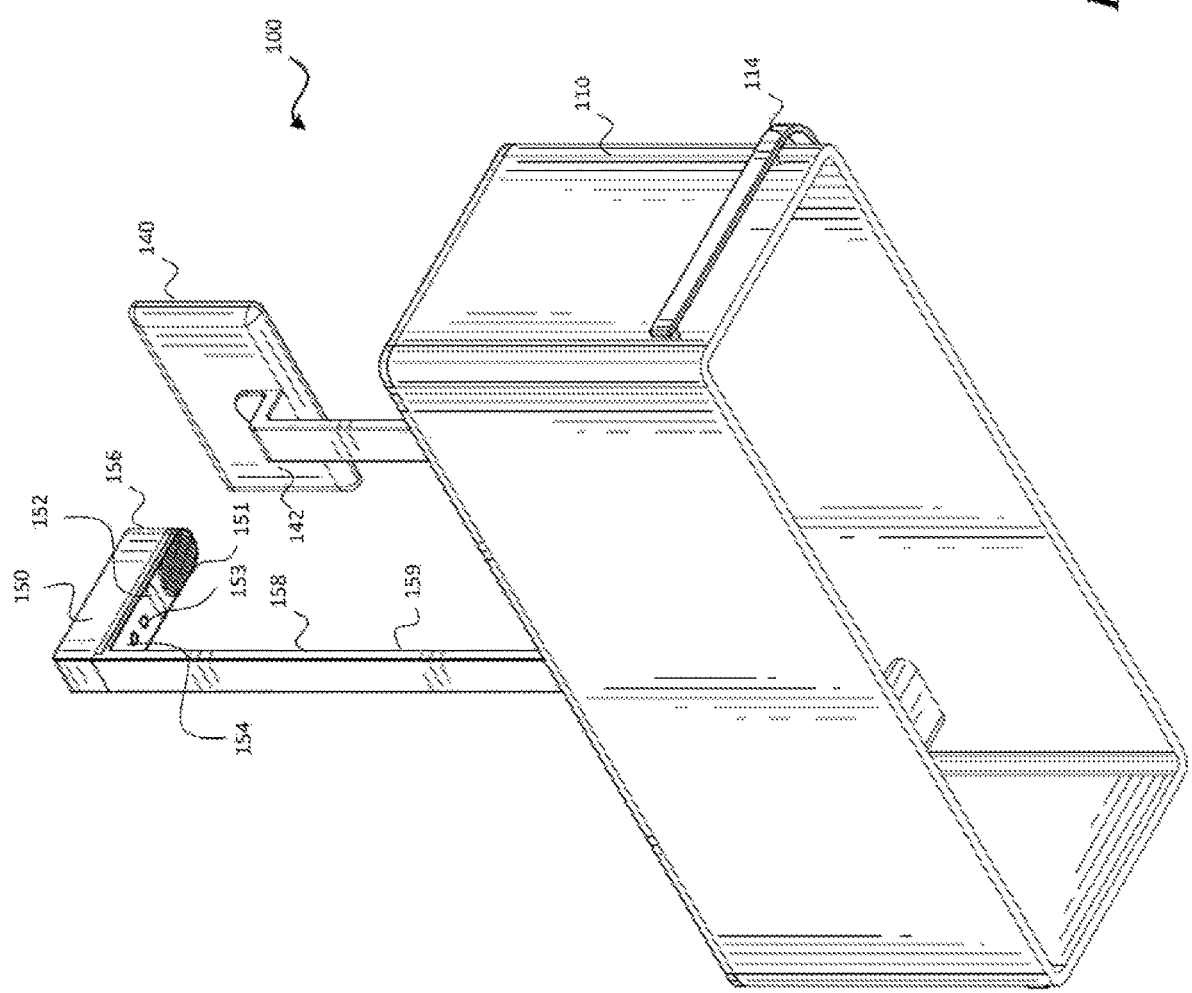
FIG. 2 is an illustration of the checkout terminal of FIG. 1 in a bottom rear perspective view accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices, and methods are provided for a checkout terminal for retail purchases. Generally, checkout terminals are point of sale (POS) systems provided in retail stores to process checkout and other retail transactions. A checkout terminal may be a clerk or customer-operated terminal configured to identify products for purchase and accept payment for the purchase.

In some embodiments, a checkout terminal system comprises a camera array, a display device, a weight scale, and a control circuit coupled to the camera array, the display device, and the weight scale. The control circuit may be configured to identify, based at least on images captured by the camera array, product identifiers associated with a plurality of different items placed in a placement area and on the weight scale, determine a combined weight of the plurality of different items based on product weight information stored in a product database, retrieve a weight measurement measured by the weight scale, detect for unaccounted items based on comparing the combined weight the plurality of different items and the weight measurement, and in the event that an unaccounted item is detected, display, via the display device, instructions to move one or more items to identify the unaccounted item.

Referring now to the drawings, in FIGS. 1-4, views of a checkout terminal 100 according to some embodiments are shown. FIG. 1 comprises a top front perspective view, FIG.

Figure 3A:
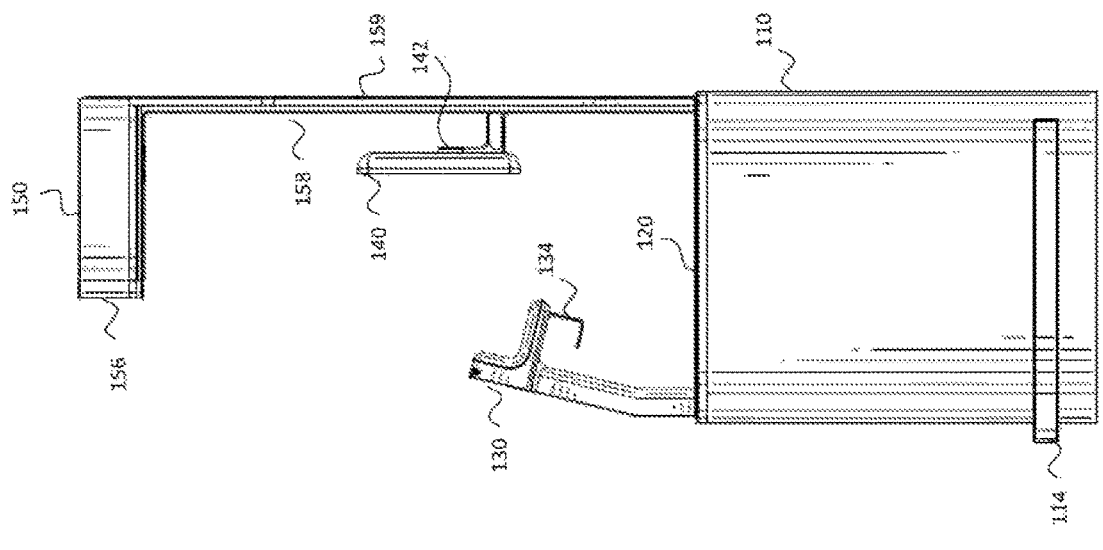
FIGS. 3A and 3B are illustrations of right and left side views of the checkout terminal of FIG. 1 in accordance with some embodiments.
Figure 3B:
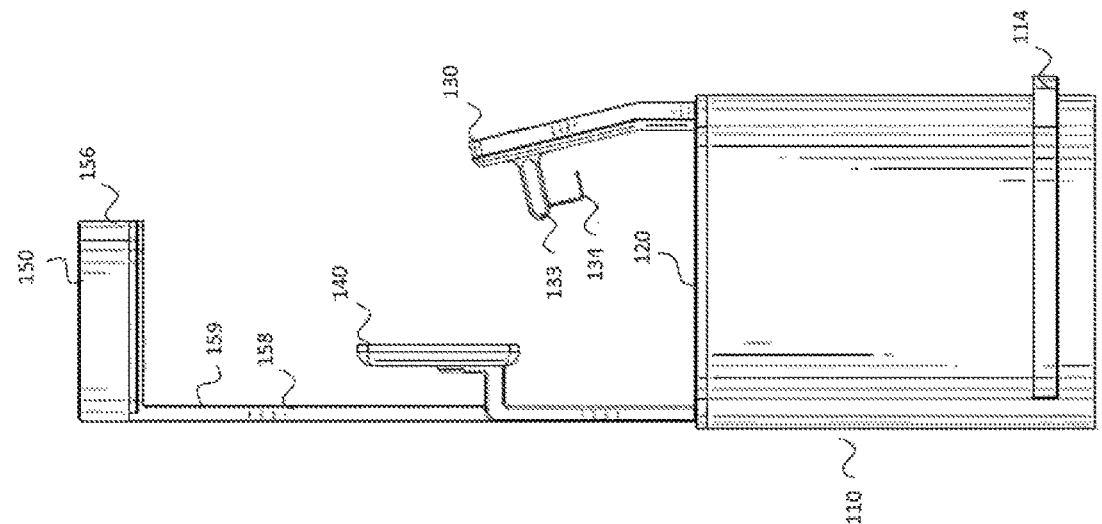
Figure 4:
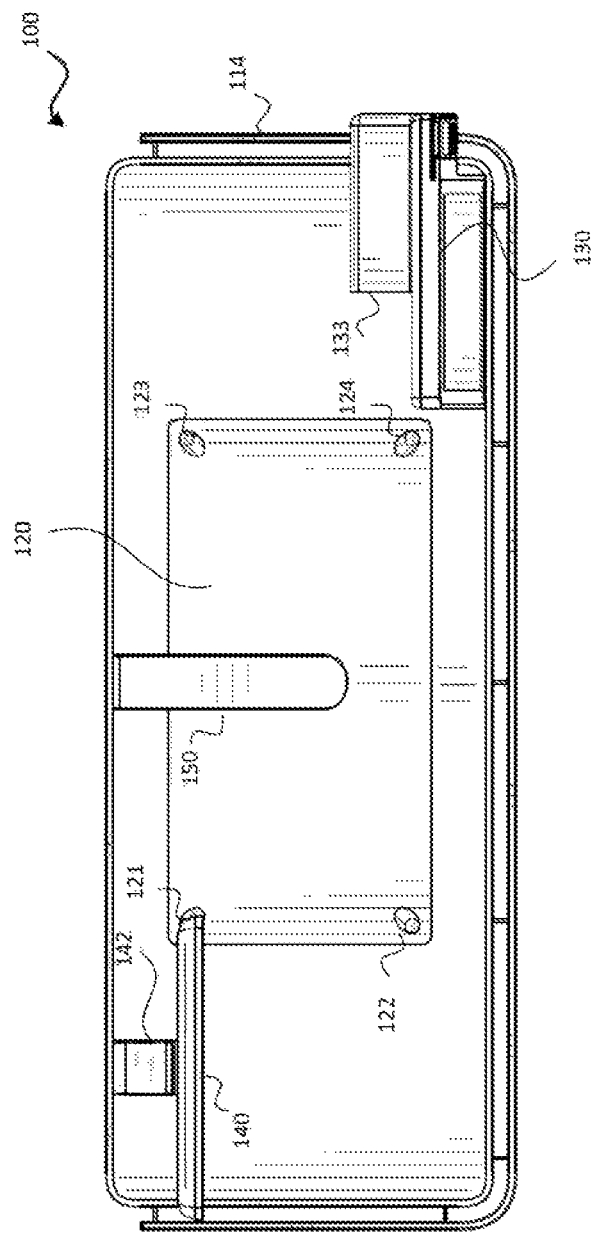
FIG. 4 is an illustration of the checkout terminal of FIG. 1 in a top plane view accordance with some embodiments.

2 comprises a bottom rear perspective view, FIG. 3A comprises a left side view, FIG. 3B comprises a right-side view, and FIG. 4B comprises a top plane view of the checkout terminal 100. The same reference numbers in FIGS. 1-4 generally refer to the same parts in each figure.

The checkout terminal 100 is a point-of-sale system in a retail environment that identifies items for checkout transactions and facilitates the processing of the purchase of the items. The checkout terminal 100 may be a store employee-operated terminal or a customer self-checkout terminal. The checkout terminal 100 comprises a platform portion 110, a scale module 120, a first user interface unit 130, a second user interface unit 140, and an overhead unit 150.

The scale module 120 includes a top surface comprising a placement area on which products may be placed for identification during a checkout process. A grouping of different products may be placed on the scale module 120 in a shopping container such as a shopping basket or a tote. The scale module 120 includes one or more load cells for measuring the total weight of items placed on the weight scale. The scale module 120 further has integrated within it, four cameras 121, 122, 123, and 124 for capturing images of the products placed on the weight scale from four corners of the placement area. In some embodiments, the cameras 121, 122, 123, and 124 may comprise high-resolution 2D cameras each situated and oriented to provide a different field of view of items placed on the scale module 120. In some embodiments, the top surface of the scale module 120 may be transparent or translucent such that one or more cameras positioned beneath the surface may capture images of the side of items facing on the weight scale. The scale module 120 may further include an RFID reader (not shown) integrated under the surface that is configured to detect RFID tags on products in the placement area. In some embodiments, the scale module 120, along with the integrated RFID reader and cameras 121, 122, 123, and 124, may comprise a removable module that can be removed and replaced as a unit. An example of a scale module 120 according to some embodiments is described with reference to FIGS. 5A and 5B herein.

The first user interface unit 130 includes a display device 131, a card reader 132, and a 3D camera 133. The display device 131 may display identified item information and information associated with the purchase transaction. For example, the display screen may display names and quantities of items as they are identified such that a user may verify the product identification and select to proceed to pay for the purchase of the items. In some embodiments, the display device 131 may comprise a touch screen configured to accept user input. The card reader 132 is mounted to the side of the display device 131 and configured to accept payment (e.g. credit card, debit card, mobile wallet payment, Near Field Communication (NFC) payment) for checkout transactions. The 3D camera 133 is mounted behind the display device 131 and the card reader 132 and is configured to capture 3D images of items placed in the placement area from the front right-side view. In some embodiments, a scanner holder 134 may be attached below the 3D camera 133 for docking a hand-held scanner (not shown) when not in use.

The second user interface unit 140 comprises a display device 141. In some embodiments, the display device 141 may be configured to display item scanning instructions, such as instructions to lift an item for scanning or weighting. In some embodiments, the display device 141 may display real-time images captured by one of the cameras of the checkout terminal, and the item associated with the instruction may be marked or highlighted in the image. In some embodiments, the display device 141 may comprise a touch screen configured to accept user input relating to item identification. The second user interface unit 140 further comprises a 3D camera 142 mounted behind the display device 141 and configured to capture 3D images of items placed in the placement area from the back left side.

The overhead unit 150 is connected to the platform portion 110 and supported by a vertical support 159. The overhead unit 150 includes a light source 151, a 3D camera 152, two 2D cameras 153 and 154, and an indicator light 156. The light source 151 may be configured to affect the lighting condition of objects placed in the placement area to enhance images captured by the cameras of the system. In some embodiments, the light source 151 may further include a light sensor for measuring the ambient lighting condition. In some embodiments, the light source 151 may be controlled to output lighting with variable color, wavelength, luminosity, and/r angle for controlling the lighting condition of the placement area to compensate for ambient lighting conditions. The 3D camera 152 comprises a depth-sensing camera configured to capture 3D images of the products in the placement area from the top side. The 2D cameras 153 and 154 comprise fixed position cameras at different focal lengths configured to each capture images of products in the placement area from the top view. For example, 2D camera 153 may include a 12 mm lens while the 2D camera 154 may include a 16.3 mm lens. In some embodiments, the overhead unit 150, including the light source 151, the 3D camera 152, and the two 2D cameras 153 and 154 may comprise a removable module that can be removed and replaced as a unit. The indicator light 156 may comprise a color-changing indicator (e.g. LED) that indicates the status of the checkout terminal (e.g. available, in use, assistance needed, out of order) to customers and employees. The vertical support 159 is coupled to the platform portion 110 on one end and the overhead unit 150 on the other. A 3D camera 158 is positioned on the vertical support 159 and configured to capture 3D images of products placed in the placement area from a top back view.

The platform portion 110 includes a housing for some internal components of the checkout terminal 100 and includes a guard 114 for protecting the checkout terminal 100 from impacts with persons and shopping carts. The housing includes an opening for a receipt printer 111 housed within the housing. In some embodiments, the receipt printer 111 may comprise a removable module that can be removed and replaced as a unit.

Figure 11:
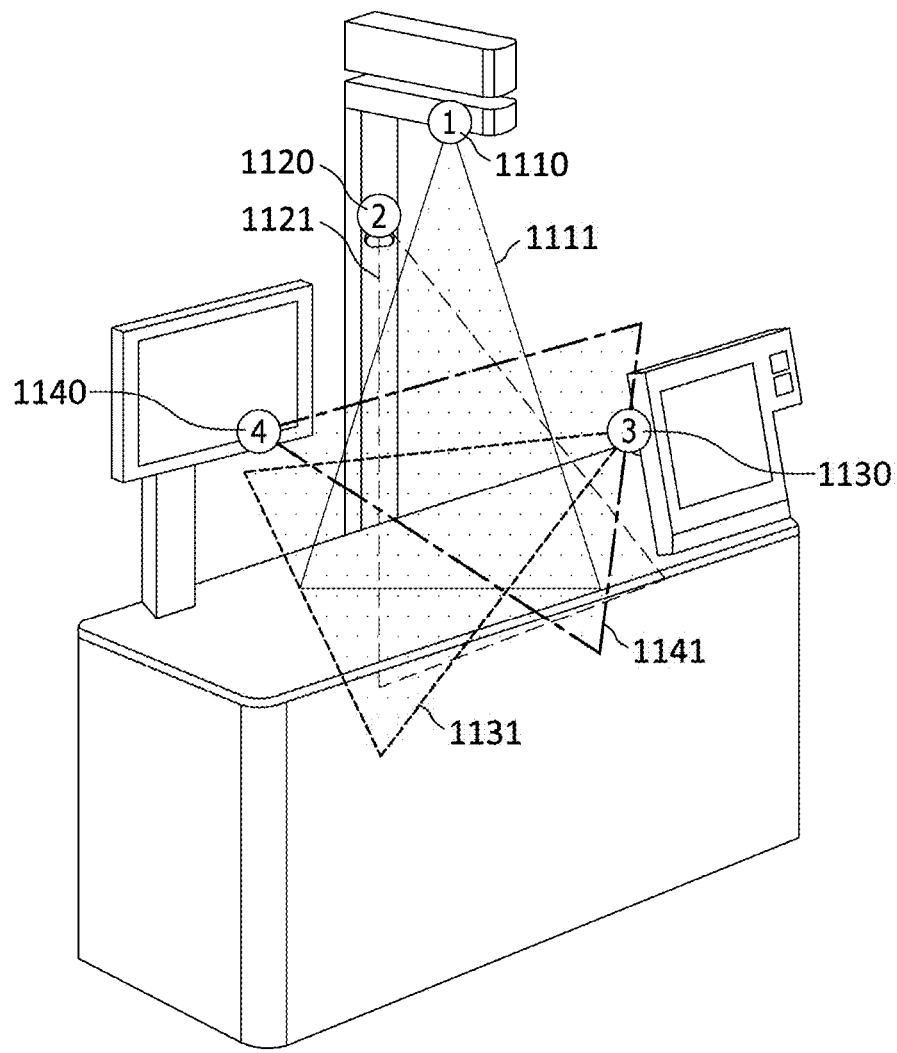
FIG. 11 is an illustration of a 3D camera array configuration in accordance with some embodiments.
Figure 12:
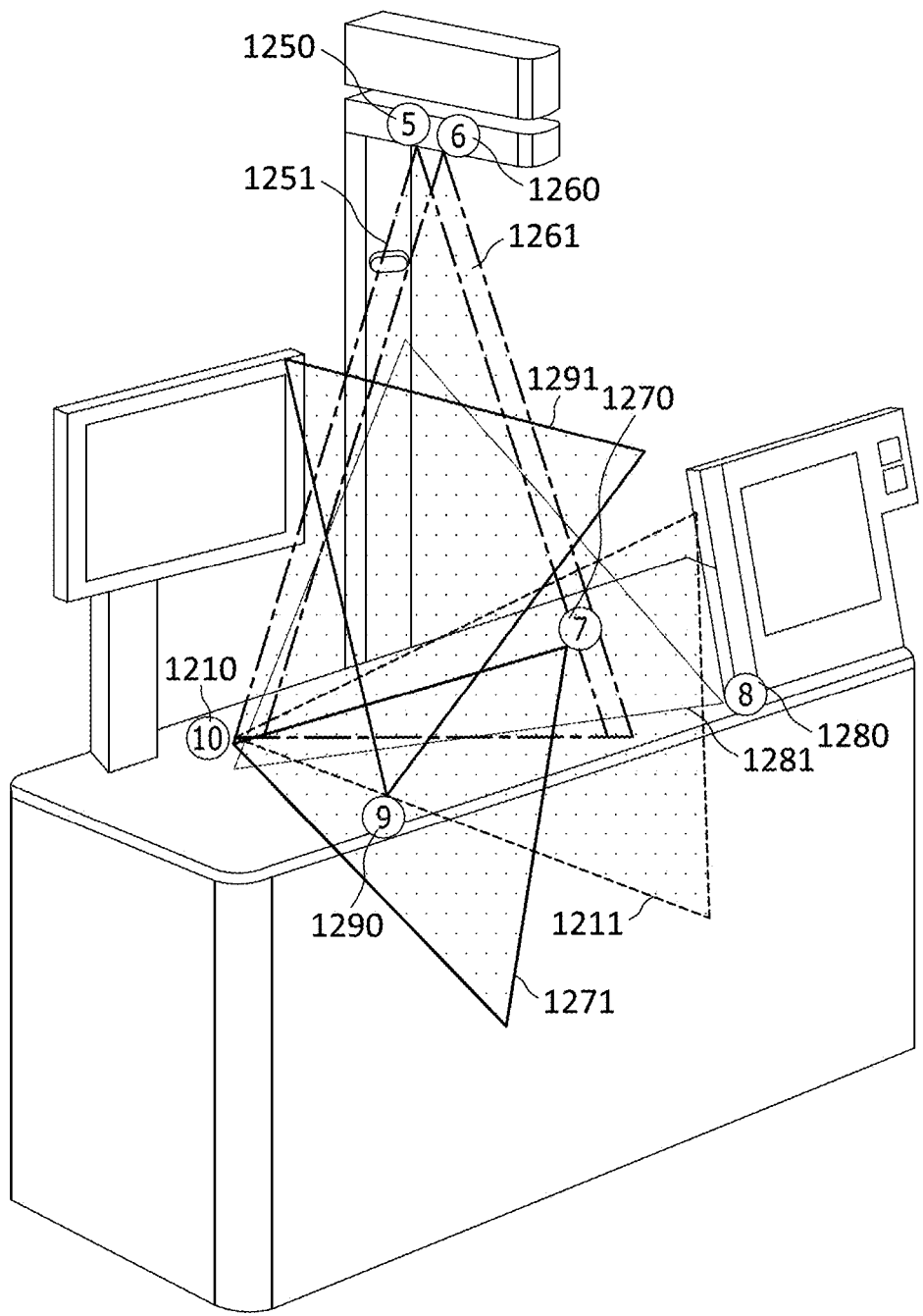
FIG. 12 is an illustration of a 2D camera array configuration in accordance with some embodiments.

In the embodiment shown in FIGS. 1-4, the checkout terminal 100 includes four 3D cameras 133, 142, 152, and 158 which may be collectively referred to as a 3D camera array. As shown in FIGS. 1-4, the four 3D cameras are positioned around the placement area to provide different fields of view of the placement area of the checkout terminal. An illustration of different fields of view provided by the 3D camera array is shown in FIG. 11. The checkout terminal 100 further includes six 2D cameras 121, 122, 123, 124, 153, and 154 which may be collectively referred to as a 2D camera array. As shown in FIGS. 1-4, the six 2D cameras are positioned around the placement area to provide different fields of view of the placement area of the checkout terminal. An illustration of different fields of view provided by the 2D camera array is shown in FIG. 12. The number of cameras in the 2D camera array and the 3D camera array of the checkout terminal may vary for different embodiments. In some embodiments, the placements and positions of cameras and other components of the checkout terminal may also vary without departing from the spirit of the present disclosure.

In some embodiments, the checkout terminal 100 may further include a hand-held scanner (e.g. laser scanner, LED scanner) configured to scan optically readable codes of products in the placement area or left in a shopping cart. In some embodiments, the checkout terminal 100 may further include a floor scale positioned on the ground in front of the platform portion 110 of the checkout terminal 100. The floor scale may be configured to determine the weight of the content of a shopping cart brought to the checkout terminal. In some embodiments, the checkout terminal 100 may be anchored to the floor via magnetic couplers that also transmit power and data to the checkout terminal 100.

Figure 13:
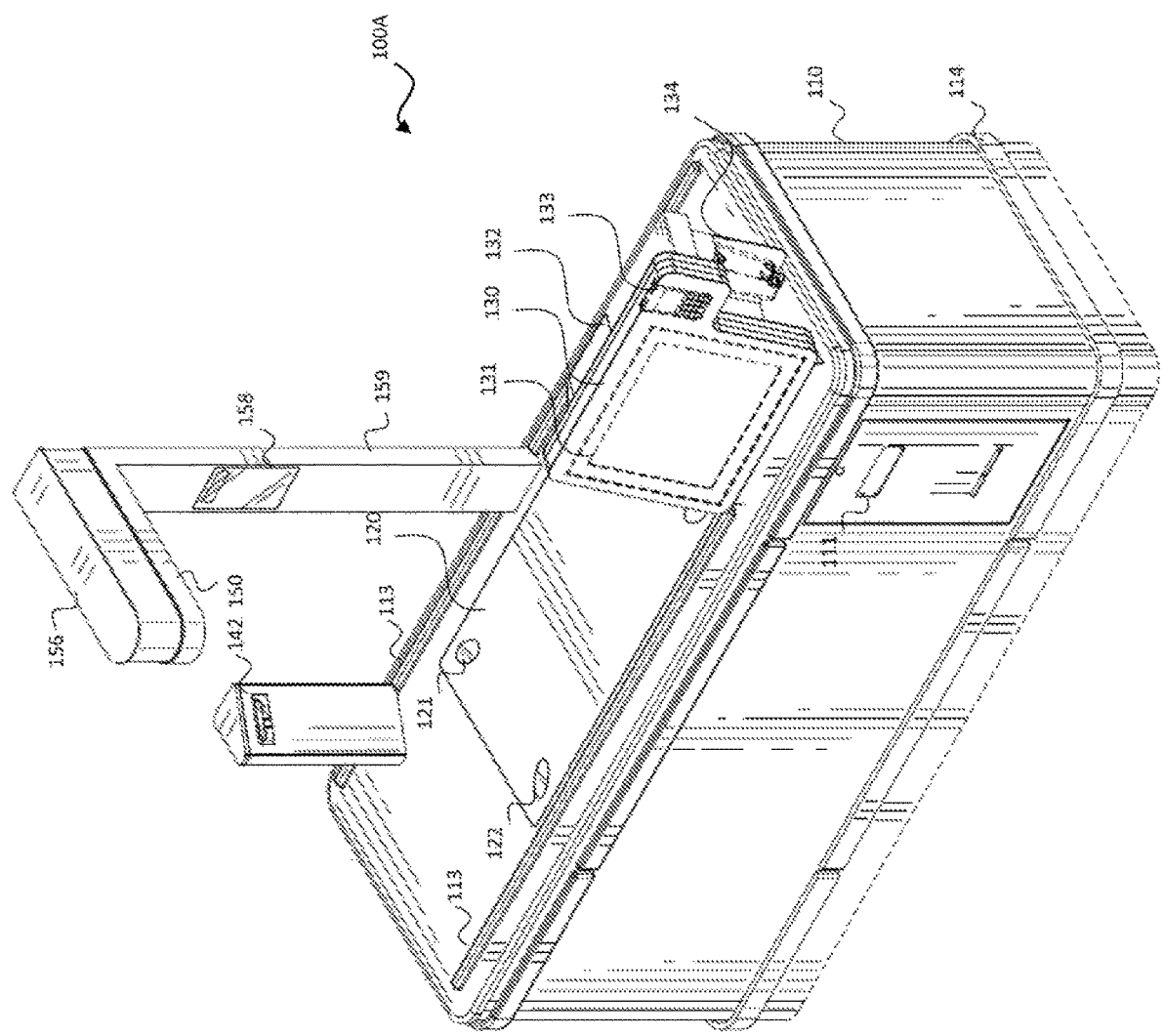
FIG. 13 is an illustration of a checkout terminal in a top front perspective view in accordance with some embodiments.
Figure 14:
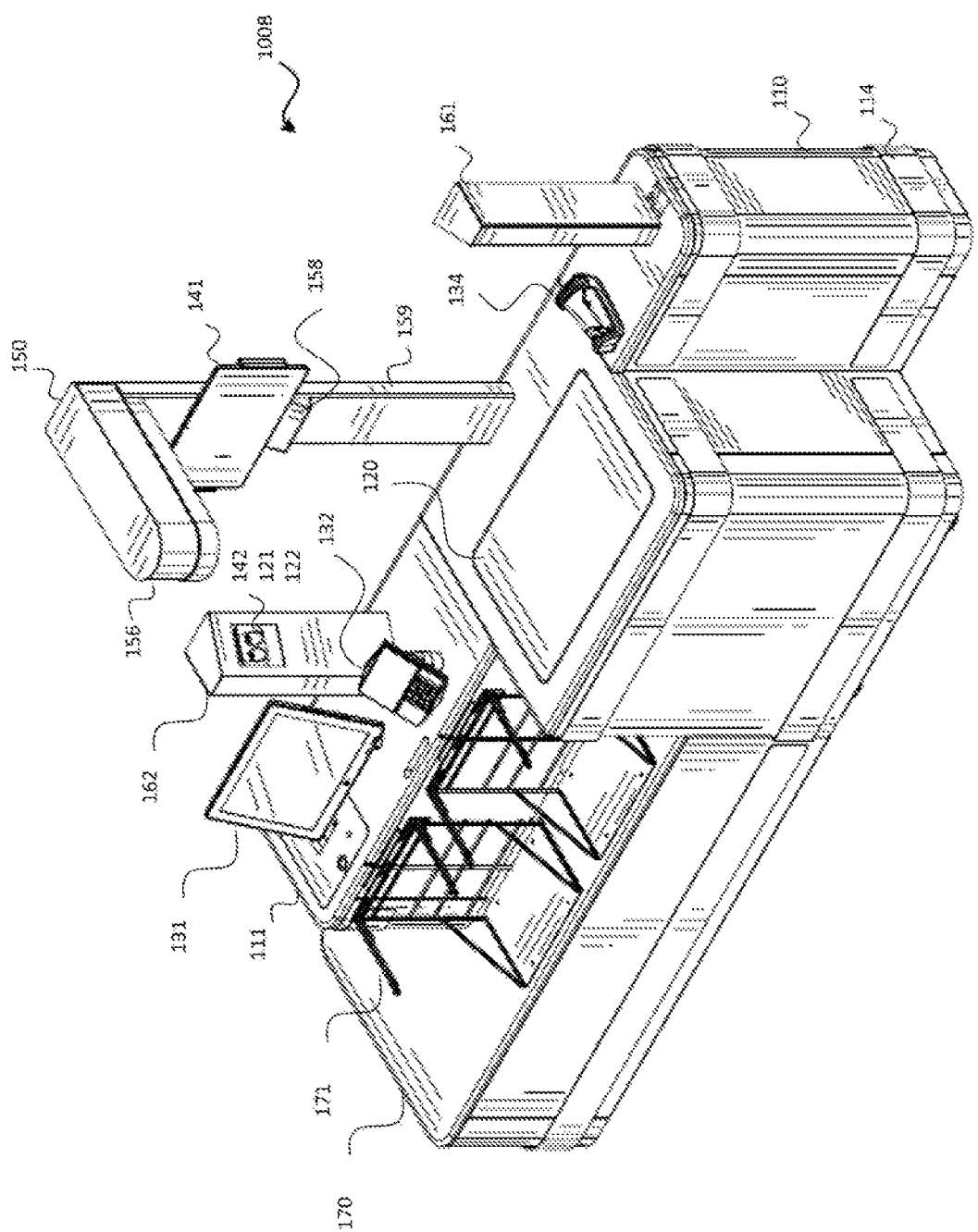
FIG. 14 is an illustration of a checkout terminal in a top front perspective view in accordance with some embodiments.
Figure 15:
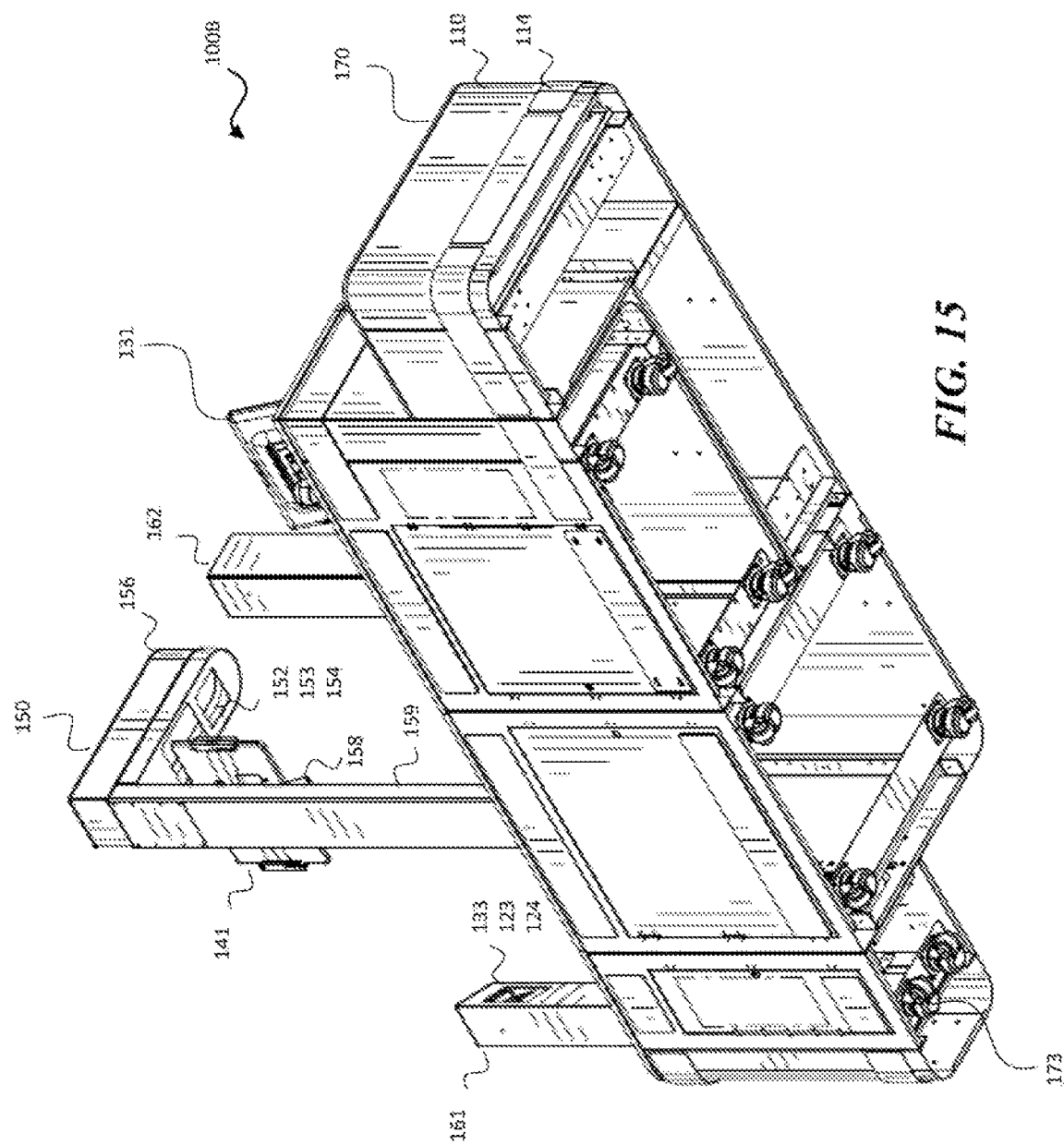
FIG. 15 is an illustration of the checkout terminal of FIG. 14 in a bottom rear perspective view accordance with some embodiments.
Figure 16B:
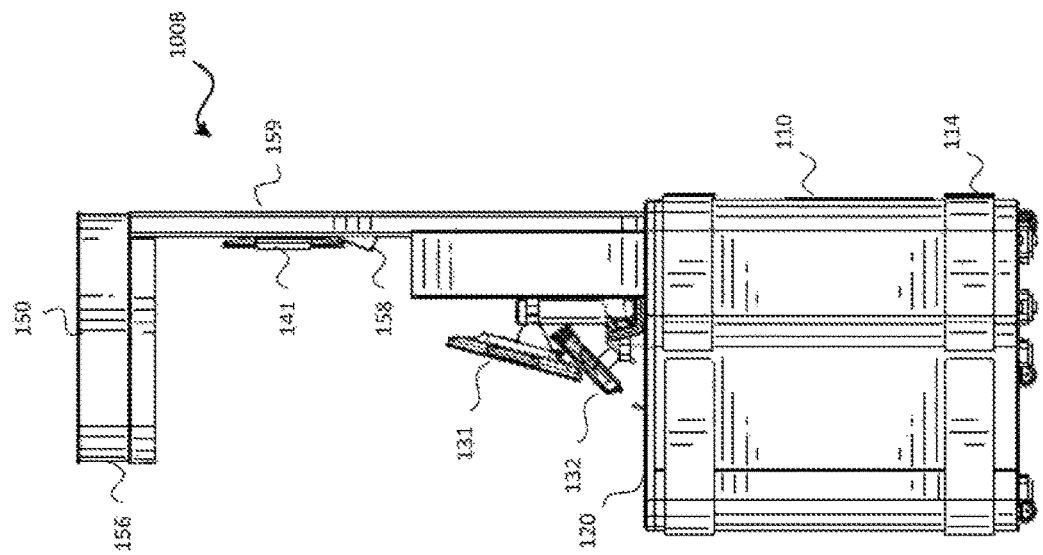
FIGS. 16A and 16B are illustrations of right and left side views of the checkout terminal of FIG. 14 in accordance with some embodiments.
Figure 16A:
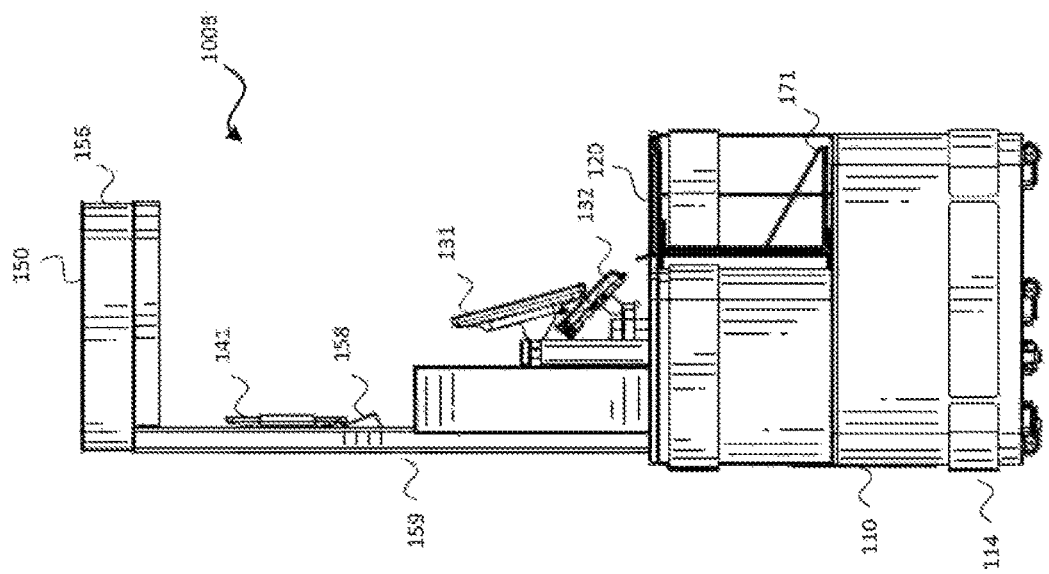
Figure 17:
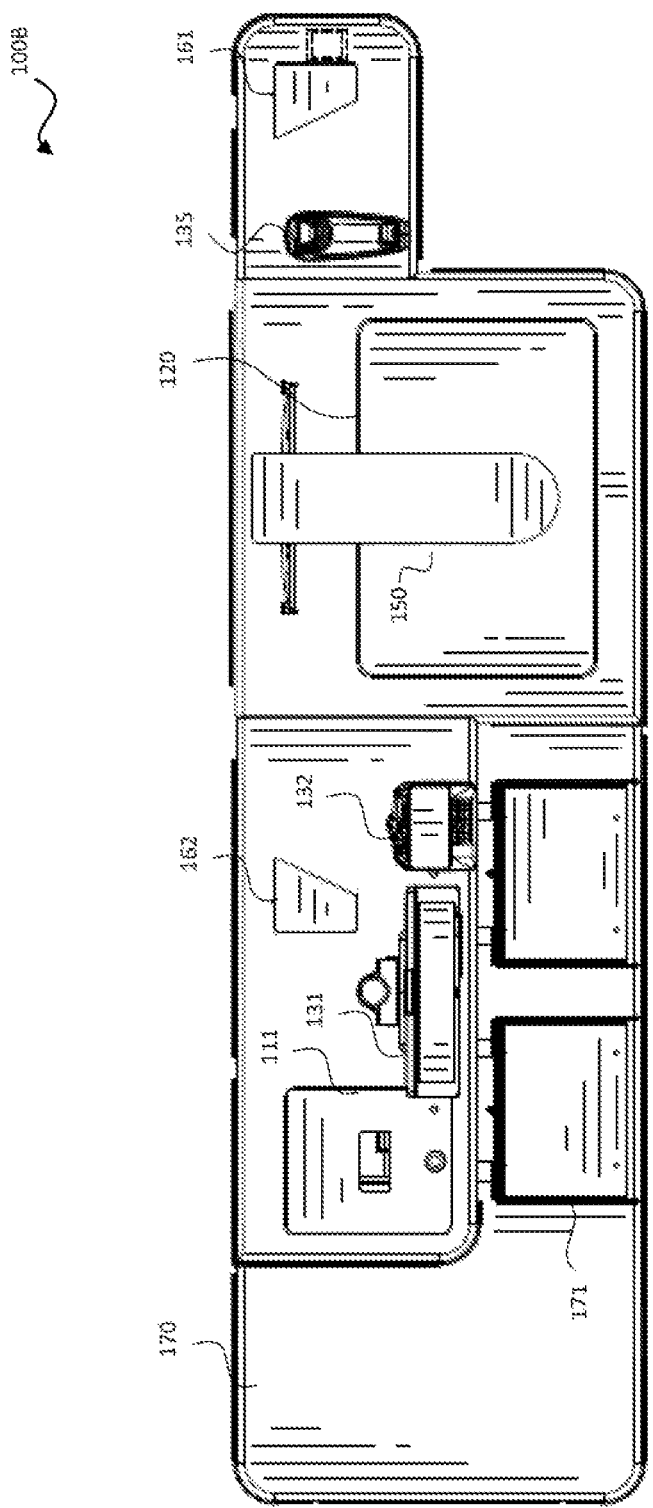
FIG. 17 is an illustration of the checkout terminal of FIG. 14 in a top plane view accordance with some embodiments.

Next referring to FIG. 13, a checkout terminal 100A according to some embodiments is shown. The checkout terminal 100A is a variation of the checkout terminal 100 wherein the same part numbers generally refer to same or similar components. In the checkout terminal 100A, the display device 141 of the second user interface unit 140 is omitted and all graphical user interface (GUI) for providing user information and instructions are displayed via the display device 131. The 3D camera 142 is mounted on a support without the display screen. The checkout terminal 100A further includes bumpers 113 along the upper and lower edge of the top of the platform portion 110 for preventing items from rolling off the placement area of the platform portion 110. The appearances and shapes of the first user interface unit 130 and the slot of the receipt printer 111 are also modified relative to checkout terminal 100.

Figure 5A:
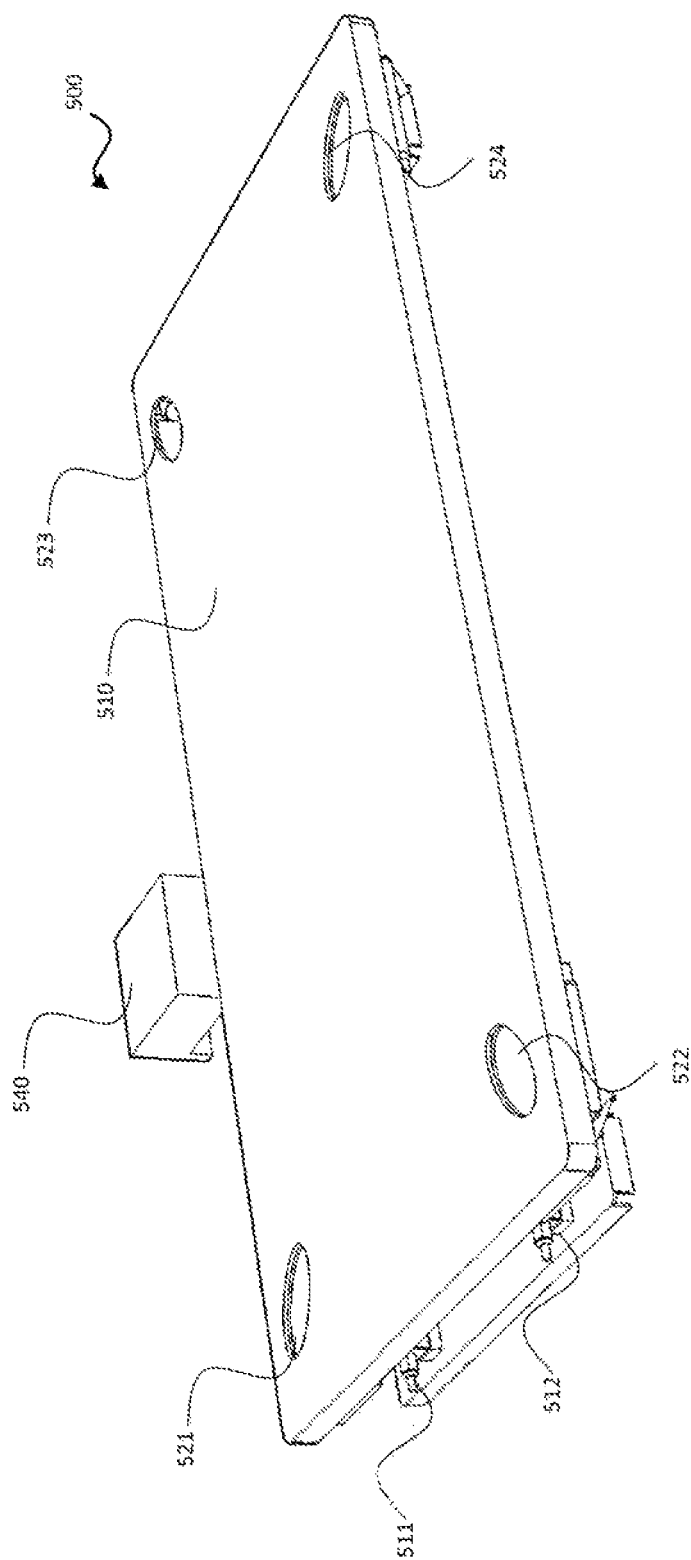
FIGS. 5A and 5B are illustrations of top and bottom views of a scale module in accordance with some embodiments.
Figure 5B:
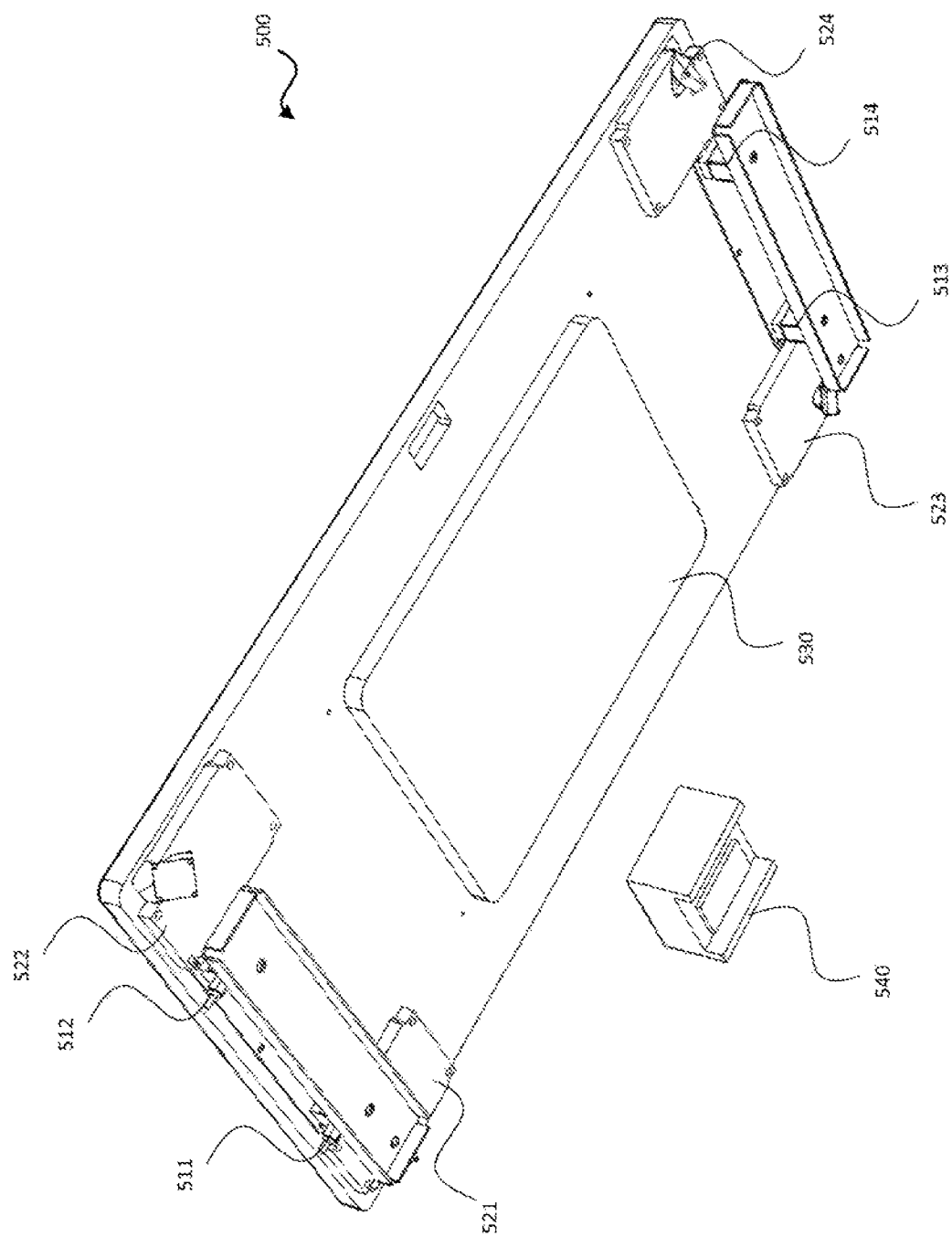

Next referring to FIGS. 5A and 5B, views of a scale module of a checkout terminal according to some embodiments are shown. FIG. 5A comprises a top view and FIG. 5B comprises a bottom view of the scale module. The same reference numbers in FIGS. 5A and 5B refer to the same parts in each figure.

The scale module 500 comprises a top surface 510 for receiving products to be identified during the checkout process. The top surface 510 includes four openings through which cameras 521, 522, 523, and 524 are positioned to provide different fields of view of items placed on the top surface 510. The top surface 510 is supported by four load cells 511, 512, 513, and 514 that are configured to measure the weight of items placed on the top surface 510. An RFID reader 530 is mounted to the bottom of the top surface 510 and configured to detect product identifiers from RFID tags attached to products placed on the top surface 510.

In some embodiments, the scale module 500 is shaped to be inserted into a scale module slot of the checkout terminal and couple to connections of the checkout terminal to receive power and exchange data with the checkout terminal. In some embodiments, the scale module 500 may be removed from the checkout terminal for serving or replacement as a unit.

In some embodiments, the checkout terminal further comprises a light sensor 540 mounted approximately at the same level as the top surface 510 of the scale module 500. In some embodiments, the light sensor 540 provides measurements of lighting conditions to a control circuit to automatically adjust the temperature and brightness of the physical lighting of the light source in the overhead unit for the customer and the cameras. In some embodiments, the measured lighting condition may be used by a backend system to modify the captured images and control the synthetic lighting for images used for CV training.

Figure 6:
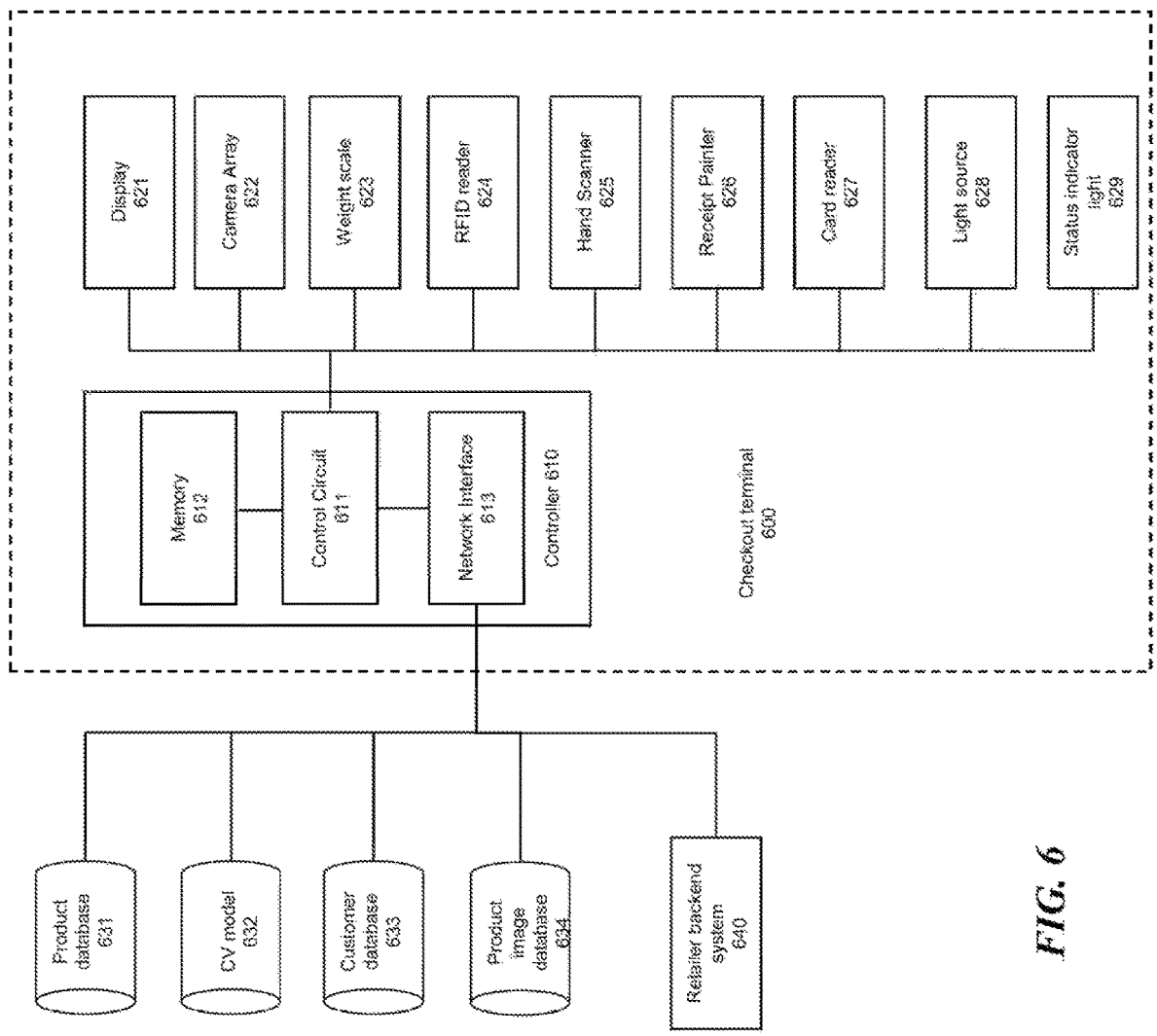
FIG. 6 is a block diagram of a system in accordance with some embodiments.

Next referring to FIG. 6, a checkout terminal system for retail transactions is shown. The system includes a controller 610 coupled to a display device 621, a camera array 622, a weight scale 623, an RFID reader 624, a hand scanner 625, a receipt printer 626, a card reader 627, a light source 628, and a status indicator light 629. In some embodiments, the controller 610 and one or more of the display device 621, the camera array 622, the weight scale 623, the RFID reader 624, the hand scanner 625, the receipt printer 626, the card reader 627, the light source 628, and a status indicator light 629 may comprise a checkout terminal 600. The controller 610 further communicates with a product database 631, a computer vision (CV) model 632, a customer database 633, and a product image database 634 to retrieve and store information. The controller 610 also communicates with the retailer backend system 640 for processing retail transactions via the checkout terminal 600.

The controller 610 comprises a control circuit 611, a memory 612, and a network interface device 613. The controller 610 may be housed in a housing of the checkout terminal. The control circuit 611 may comprise one or more of a processor, a microprocessor, a central processing unit (CPU), a graphics processing unit (GPU), an application-specific integrated circuit (ASIC), and the like and may be configured to execute computer-readable instructions stored on a computer-readable storage memory 612. The computer-readable storage memory 612 may comprise volatile and/or non-volatile memory and have stored upon it, computer-readable instructions which, when executed by the control circuit 611, causes the controller 610 to identify items brought to the checkout terminal and facilitate a retail transaction for the purchase of the identified items. In some embodiments, the controller 610 may be implemented with a plurality of memory devices and/or processors as shown in, for example, FIG. 7. In some embodiments, the computer-executable instructions may cause the control circuit 611 of the controller 610 to perform one or more steps described with reference to FIGS. 8-10 herein.

The network interface device 613 may comprise a data port, a wired or wireless network adapter, and the like. In some embodiments, the network interface device 613 may comprise a magnetic connector configured to attach to a magnetic floor anchor that provides power and data to the checkout terminal 600. In some embodiments, the controller 610 may communicate with the retailer backend system 640 and one or more of the product database 631, the CV model 632, customer database 633, and product image database 634 via a network such as a local network, a private network, or the Internet.

The display device 621 comprises a display device configured to display information to a user. In some embodiments, the display device 621 may comprise a touch screen also configured to receive input from the customer. In some embodiments, the checkout terminal 600 may comprise two or more differently positioned display devices configured to display different information. For example, a first display device may be positioned behind the placement area for displaying scanning instructions and a second device display may be positioned at the front side of the checkout terminal for accepting user input to complete a transaction.

The camera array 622 may comprise 2D and/or 3D cameras for capturing images of products brought to the checkout terminal. In some embodiments, the camera array 622 may include a plurality of 2D cameras configured to capture symbology information from products. Generally, symbology in the context of product identification refers to visual symbols (e.g. barcode, QR code, product watermark)

that encode product identifiers (e.g. UPC, SKU, etc.). In some embodiments, product watermarks may comprise nearly imperceptible repetitive markings on products that cover multiple surfaces of the product to provide product identification from different views, an example being Digimarc watermarking. The 2D cameras may comprise fixed cameras positioned around a placement area of the checkout terminal to provide different fields of view of the placement area. In some embodiments, the 2D cameras may include cameras of different focal lengths. In some embodiments, images captured by the 2D cameras may also be used for CV product identification. In some embodiments, the camera array 622 may include one or more 3D cameras configured to capture 3D images of products. The 3D cameras may comprise fixed depth-sensing cameras positioned around a placement area of the checkout terminal to provide different fields of view of the placement area. In some embodiments, the 3D cameras may be used to captured 3D point clouds and images for CV-based item identification. In some embodiments, inputs from both 2D and 3D cameras may be used for symbology detection and/or CV. In some embodiments, the camera array 622 may include only 3D cameras that are used for both symbology detection and CV. In some embodiments, the camera array 622 may include only 2D cameras that are used for both symbology detection and CV.

The weight scale 623 comprises a scale for measuring the weight of items placed in a placement area. In some embodiments, the weight scale 623 may comprise a top surface and one or more load cells beneath the top surface. In some embodiments, the weight scale 623 may have one or more cameras of the camera array 622 integrated on or beneath the surface. In some embodiments, the RFID reader 624 may also be integrated beneath the weight scale 623. In some embodiments, measurements by the weight scale may be used for item identification, cost calculation, and/or weight validation.

The RFID reader 624 comprises a sensor for detecting RFID tags on products. In some embodiments, the RFID reader 624 may be integrated under the weight scale 623 and configured to detect signals from RFID tags on products placed on the weight scale 623.

The hand scanner 625 comprises a hand-held optical scanner such as a Laser or LED barcode scanner that a user can operate to scan individual items. In some embodiments, the hand scanner 625 may be connected to the checkout terminal via a cable that allows the customer to scan items on the weight scale 823 as well as items left in the shopping cart.

The receipt printer 626 comprises a printer configured to print receipts at the completion of a transaction as instructed by the controller 610. In some embodiments, the receipt printer 626 may be housed in the platform portion of the checkout terminal 600.

The card reader 627 may comprise a device configured to accept payment card and/or mobile payment. In some embodiments, the card reader 627 may comprise a magnetic stripe reader, a chip reader, an NFC reader, a pin pad, and a display screen. The card reader 627 may be configured to receive transaction information from the control circuit 611 and forward the received payment information to a payment processing system for processing.

The light source 628 may be configured to affect the lighting condition of products placed in the placement area to enhance images captured by the cameras of the system. In some embodiments, the light source 628 may further include a light sensor for measuring the ambient lighting condition. In some embodiments, the light source 628 may be controlled to output variable color, wavelength, luminosity, and angle for controlling the lighting condition of the placement area and compensate for the ambient lighting.

The status indicator light 629 may comprise a color-changing and/or text indicator that indicates the status of the checkout terminal (e.g. available, in use, assistance needed, out of order) to customers and employees.

In some embodiments, one or more of the RFID reader 624, the hand scanner 625, the receipt printer 626, the card reader 627, the light source 628, and the status indicator light 629 may be omitted and/or optional to a checkout terminal 600. For example, a checkout terminal 600 may only identify items based on CV and symbology and omit the RFID reader 624. In another example, a camera in the camera array may be used for hand scanning instead of a separate hand scanner 625. In some embodiments, one or more of the display device 621, the camera array 622, the weight scale 623, the RFID reader 624, the hand scanner 625, the receipt printer 626, the card reader 627, the light source 628, and the status indicator light 629 may comprise one or more removable modules that can each be removed from the checkout terminal 600 as a unit for servicing or replacement. For example, a removable module may comprise one or more contacts that are positioned to automatically couple to contacts connected to the controller 610 and/or a power source when the module is inserted into a corresponding slot of the checkout terminal 600.

In some embodiments, the checkout terminal 600 may further comprise a short-range data transceiver such as a Bluetooth transceiver, an NFC transceiver, and the like for communicating with a portable device such as a smart shopping cart, a scanner attached to a shopping cart, or a customer mobile or wearable device. The communication device may be configured to receive item identification information and customer shopping path via the short-range communication device that may be used to assist CV item identification. For example, a headless scanner may be attached to a shopping cart that scans items as they are placed into the shopping cart. The scanned item information may then be retrieved by the checkout terminal 600 and compared to images captured by the camera array 622 to identify items for purchase.

The product database 631 comprises a computer-readable memory storage storing product information. In some embodiments, the product database may store information used for identifying items such as product identifiers (e.g. stock keep unit (SKU) code, universal product code (UPC), European article number (EAN), etc.), product names, product weight, product characteristic (e.g. variable weight, fixed weight), and product display location associated with products for sale.

The CV model 632 comprises a machine learning algorithm trained object identification model configured to identifying products via artificial intelligence (AI) and machine vision. In some embodiments, product identifiers (e.g. UPC, SKU) and 2D and/or 3D images of products captured by checkout terminals may be used to train the CV model to recognized products. In some embodiments, images from other sources such as manufacturer images, online images, customer captured images, etc. may also be used to train the CV model. In some embodiments, the CV model comprises a deep neural network model trained using 2D and/or 3D product images as input and product identifiers as categorizations. In some embodiments, the CV model is configured to take product images as input and output one or more product identifiers each associated with a confidence level. In some embodiments, the checkout terminal 600 may be connected to a CV service that processes captured images, identifies items based on the CV model, and provides item identification information back to the checkout terminal 600. In some embodiments, a CV algorithm using the CV model may be executed locally at the controller 610. In some embodiments, the CV model may also be trained to identify objects that are not products for sale, such as customers' personal items like reusable shopping bags, keys, wallets, mobile phones, beverage containers, etc.

The customer database 633 stores information on customers. In some embodiments, the customer database 633 may store membership information and/or past purchase history associated with customers. In some embodiments, the information stored in the customer database 633 may be used to determine a confidence score of a CV-recognized item. For example, if the CV algorithm identifies an object with 75% confidence and the identified object matches the purchase pattern of the customer, the confidence score may be boosted to 80%. In some embodiments, customer purchase history may be used to select between two or more items with similar CV identification confidence levels. In some embodiments, the information stored in the customer database 633 may be used by the checkout terminal 600 to determine a weight deviation tolerance for a transaction. For example, a customer with a long purchase history with the retailer may be allowed to complete the checkout process with a greater weight deviation between the combined weight of the identified items and the measured weight.

The product image database 634 is configured to store product identifiers and associated product images from the manufacturers, vendors, suppliers, or aggregated from the web. In some embodiments, the images in the product image database 634 may be used to match items detected by the camera array 622 and items identified based on symbology and/or RFID. For example, when an item is identified through symbology and/or RFID, image(s) associated with the detected item identifier may be retrieved from the product image database 634 and compared to the captured images of items in the placement area. In some embodiments, images in the product image database 634 may also be used to train the CV model 632 or a separate product image model for similarity comparison, and the matching of detected and RFID or symbology-identified items may be based on the trained model.

In some embodiments, one or more of the product database 631, the CV model 632, the product image database 634, the customer database 633, and the product image database 634 may be implemented on one or more local, remote, or cloud-based storage and/or be at least partially stored locally at the memory 612 of the checkout terminal 600. In some embodiments, one or more of the product database 631, the CV model 632, the product image database 634, and the customer database 633 is updated and/or accessed by a plurality of checkout terminal in geographically distributed locations and may be considered part of the retailer backend system 640.

The retailer backend system 640 may comprise retailer systems such as an inventory system, a transaction processing system, a payment processing system, etc. that supports the processing of transactions at the checkout terminal. For example, the checkout terminal 600 may query the retailer backend system 640 for current pricing of products, transmit payment information to the retailer backend system 640 for payment processing, and notify the inventory system when a purchase transaction is completed.

Figure 7:
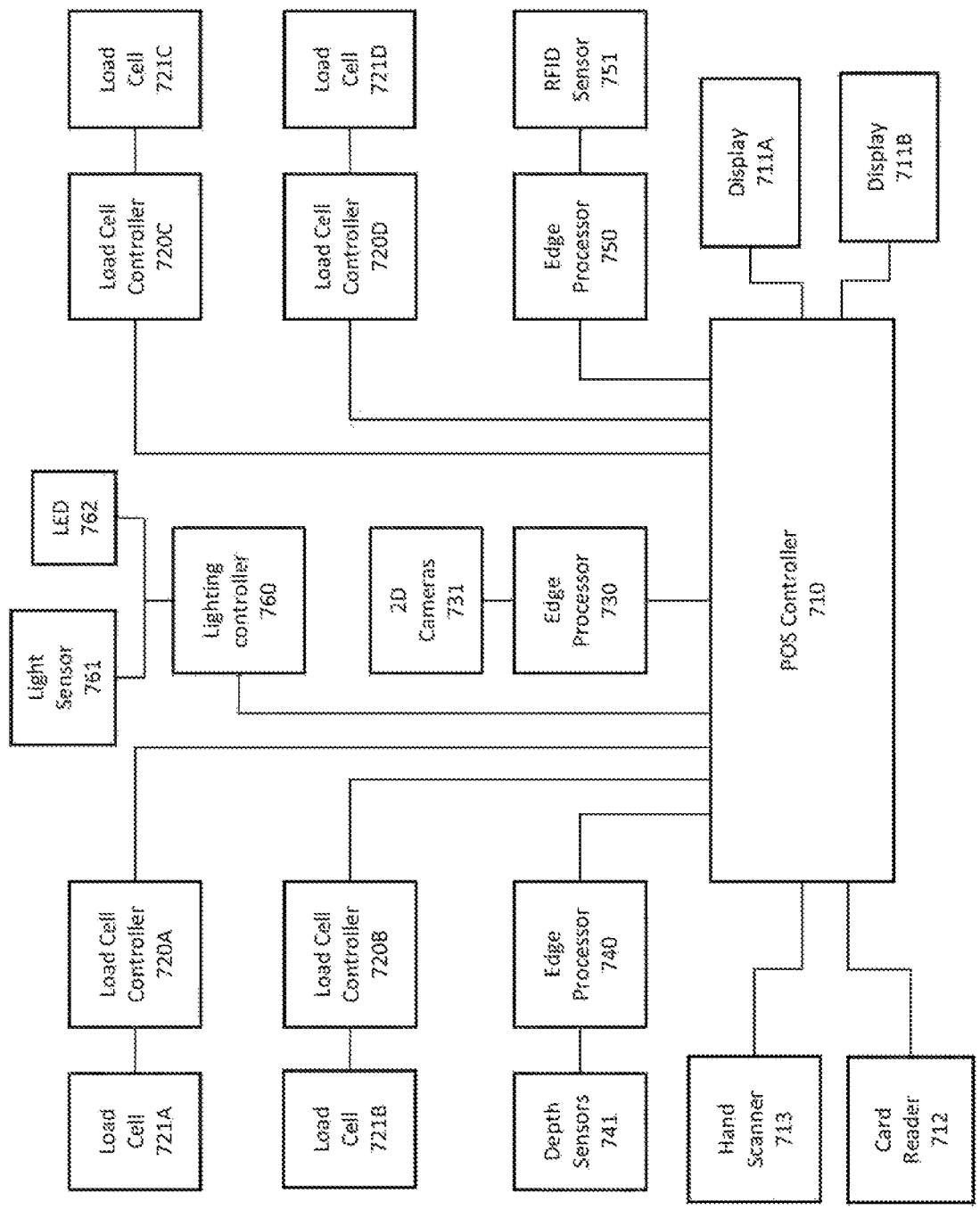
FIG. 7 is a block diagram of a checkout terminal in accordance with some embodiments.

Next referring to FIG. 7, a checkout terminal system for retail transactions is shown. The checkout terminal system includes a POS controller 710 that is configured to combine the signals from different sensors of the checkout terminal to identify items for purchase and facilitate the processing of a purchase transaction for the identified items. The system includes loads cells 721-A-B, depth sensors 741, 2D cameras 731, an RFID sensor 751, two displays 711A-B, a hand scanner 713, a card reader 712, and a LED light 762.

The four load cells, 721A, 721B, 721C, and 721D are each coupled to a load cell controller 720A, 720B, 720C, and 720D respectively. The load cells may be distributed beneath a top surface of a weight scale to collectively measure the total weight of items placed on the scale. In some embodiments, a load cell controller may comprise a single board computer (SBC) configured to receive and forward the weight measurement signal to the POS controller 710. In some embodiments, the load cell controller may further be configured to calibrate and store calibration settings for the corresponding load cell.

The LED light 762 and the light sensor 761 are coupled to a lighting controller 760. The lighting controller may comprise an SBC configured to adjust the color, brightness, and/or angle of the LED light 762 based on the light condition detected by the light sensor 761. In some embodiments, the lighting controller 760 may provide detected ambient lighting readings to the POS controller 710 for image adjustment. In some embodiments, the lighting controller 760 may use images captured by the 2D cameras to determine the ambient lighting condition for lighting adjustment.

The depth sensor 741 is coupled to an edge processor 740 configured to perform object identification based on images captured by the depth sensor 741. In some embodiments, the edge processor 740 may perform CV object identification based on a trained CV model to detect and identify items placed on a weight scale. The edge processor 740 may capture images, detect objects in captured images, identify products among the detected objects, and output confidence levels associated with each product identification to the POS controller 710. In some embodiments, the edge processor 740 may access a remote CV model that is trained based on image and product identifier data captured by a plurality of checkout terminals.

The 2D cameras 731 are coupled to an edge processor 730 configured to perform symbology detection based on images captured by the 2D cameras 731. In some embodiments, the edge processor 730 may detect barcodes, QR codes, and product watermarks in the captured images and send the detected product identifiers and quantities to the POS controller 710.

The RFID reader is coupled to an edge processor 750 configured to derive product identifiers based on signals detected by the RFID sensor 751. In some embodiments, the edge processor 750 may be configured to send the detected product identifiers and quantities to the POS controller 710.

In some embodiments, each of the edge processors 730, 740, and 750 may comprise a system on a chip (SoC) device designed for efficient image processing and machine learning, such as the NVidia Jetson AGX Xavier module.

The displays 711A and 711B may be configured by the POS controller 710 to display information and instructions for a checkout transaction. The hand scanner 713 may be operated by a user to scan for optically readable codes on products. The card reader 712 may be operated by a user to input payment information.

With the system shown in FIG. 7, CV object identification, RFID identification, and symbology detection are each handled by a separate edge processor in parallel. The identifications are then combined and reconciled at the POS controller 710, increasing the processing efficiency of the system.

Figure 8:
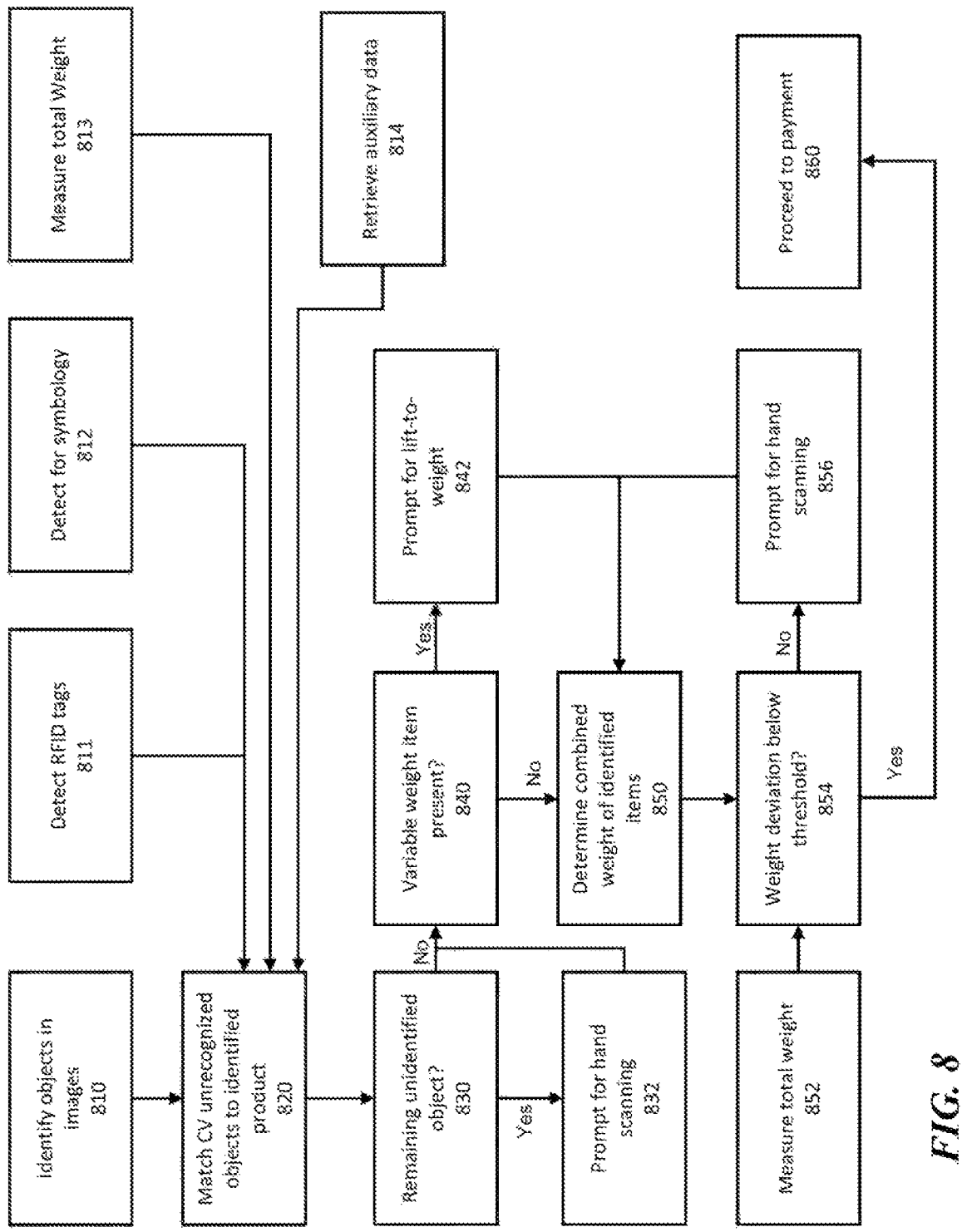
FIG. 8 is a flow diagram of a checkout process in accordance with some embodiments.

Referring next to FIG. 8, a method for facilitating a checkout transaction at a checkout terminal is shown. In some embodiments, the steps shown in FIG. 8 may be performed by a processor-based device such as a control circuit executing a set of computer-readable instructions stored on a computer-readable memory. In some embodiments, one or more steps of FIG. 8 may be performed by the checkout terminal 100 described with reference to FIGS. 1-4 and/or the checkout terminal 600 described with reference to FIG. 6. In some embodiments, one or more steps of FIG. 8 may be performed by one or more of the POS controller 710 and the edge processors 730, 740, and 750 as described with reference to FIG. 7. In some embodiments, the steps of FIG. 8 may be at least partially executed by a central server that exchanges data with a plurality of checkout terminals.

To initiate checkout, a user may place products for purchase in a placement area of a checkout terminal. In some embodiments, a variety of products associated with different product identifiers (e.g. UPC, SKU) may be simultaneously placed in the placement area in a group without presorting. In some embodiments, the products on the checkout terminal may be in a container such as a shopping basket or a tote bag. In some embodiments, the container may be transparent or partially see-through, allowing imaging of the content of the container from multiple angles. In some embodiments, the products may be clustered together and vertically stacked.

In step 810, the system identifies individual objects in the images captured by the camera array of the checkout terminal. In some embodiments, step 810 may be performed based on 2D images, a 3D point cloud, or a combination of 2D and 3D image data. In some embodiments, step 810 may be based on edge detection in 2D or 3D. In some embodiments, the system may capture a 3D point cloud of the objects in the placement area, detect the edge of each object in the 3D point cloud, and draw boundary lines for the objects based on the detected edges. In step 810, the system further attempts to identify each detected object based on a computer vision (CV) algorithm. In some embodiments, the CV algorithm may use a CV model trained based on machine learning to identify products based on previously captured images of products as input and product identifiers as categorizations. In some embodiments, the CV model may comprise a deep neural network object recognition model. In some embodiments, the CV model may be trained based on images captured during checkout processes at a plurality of geographically distributed checkout terminals. In some embodiments, the CV algorithm may take 2D and/or 3D images captured by the camera of the checkout terminal as input and output one or more product identifiers (e.g. SKU, UPC) as product identification. In some embodiments, the CV model may further output a confidence level to each product identification. In some embodiments, the system may have a predetermined confidence threshold (e.g. 90%, 95%), and product identifiers outputted by the CV model with a confidence level below the threshold may be marked as an object unrecognized by CV.

In step 811, the checkout terminal detects signals from RFID tags among the objects placed in the placement area of the checkout terminal. In some embodiments, the RFID tags may be detected by an RFID reader embedded under the placement area. The RFID reader may be configured to detect product identifiers via RFID tags and determine the quantity associated with each product identifier.

In step 812, the system detects for symbology in the captured images of the objects. In some embodiments, the symbology detection may be based on the same set or a different set of images used in step 810. In some embodiments, an array of high-resolution 2D cameras may be used to perform symbology detection. In some embodiments, the system may be configured to detect barcodes, QR codes, and/or product watermarks in the images. In some embodiments, symbology detection may be based on a machine vision algorithm configured to detect barcodes, QR codes, and/or product watermarks in images. In some embodiments, CV is also used to determine the quantity of products associated with each product identifier detected based on symbology. For example, edge detection and/or orientation detection may be used to determine whether product watermarks encoding the same product identifier belong to one item or multiple items placed close together.

In step 820, objects not identified via CV in step 810 are matched to products identified via other means such as through RFID and symbology. In some embodiments, the matching may be based on retrieving product images of products identified by RFID and symbology and performing an image similarity analysis with images of objects not recognized by CV. Step 820 may further make use of the total weight measured by a weight scale of the checkout terminal in step 813 and/or other auxiliary data retrieved in step 814 to evaluate the accuracy of CV identification. An example of step 820 is described in more detail with reference to FIG. 9 herein.

In step 830, the system determines whether any object detected in step 810 is still unidentified after step 820. Generally, unidentified objects in step 830 comprise objects that cannot be identified with sufficient confidence through CV and are not otherwise identified through other means (e.g. RFID, symbology). If at least one unidentified object is present, in step 832, the system displays instructions to prompt for manual scanning of the object. In some embodiments, the system may cause an image captured by a camera array to be displayed on a display screen of the checkout terminal, and mark/highlight the unidentified object in the image. In some embodiments, the marking/highlighting may be based on the object boundary detection performed in step 810. In some embodiments, the instruction may instruct a user to remove the object from the group and scan an identifier (e.g. barcode) on the unidentified object with an optical hand scanner and/or place the object in an area separate from the group of objects so the system can obtain other views of the unidentified object. In some embodiments, identifiers and images captured in step 832 may be used to train a CV model for future product identifications. In some embodiments, the camera array may track the movement of the unidentified object to verify that the correct object is hand scanned.

When no unidentified object remains, in step 840, the system determines whether any of the identified products is a variable weight item. A variable weight item may comprise an item sold by weight (e.g. produce, deli products) or sold by units without fixed weight (e.g. pieces of fruit). If a variable weight item is present, in step 842 the system displays a prompt to lift the variable weight item. The system then determines the weight of the item based on the change in the total weight on the weight scale when the item is lifted. In some embodiments, the system may cause an image captured by a camera array to be displayed on a display screen of the checkout terminal, and mark/highlight the variable weight object. In some embodiments, the marking/highlighting may be based on the object boundary detection performed in step 810. In some embodiments, the camera array may track the movement of the variable weight item to verify that the correct item is lifted. In some embodiments, if the variable is a sold-by-weight item, the system further calculates the cost of the item based on the measured weight.

In step 850, the system determines the combined weight of identified items. In some embodiments, weight information associated with each identified item may be retrieved from a product database storing weight information associated with product identifiers. If variable weight items are present, step 850 may use the variable weight item weight measured in step 842. In step 852, the total weight of items in the placement area is measured with load cells of the weight scale of the checkout terminal. In step 854, the expected weight calculated in step 850 and the actual weight measured in step 852 are compared for weight validation. In some embodiments, the weight of the shopping container (e.g. shopping basket, tote) containing the items may be added to the expected weight in step 850 or subtracted from the measured weight in step 852. If the weight deviation between the expected and the actual weight is below a threshold, the process proceeds with the checkout process and the user may be prompted for payment to complete the purchase transaction. In some embodiments, prior to the payment, the system may allow to user to review the list of identified products, indicate any misidentifications, and input corrections. If the weight deviation exceeds a threshold, the system may determine that one or more items are not accounted for or is misidentified, and prompt for hand scanning in step 856. In some embodiments, the threshold in step 854 may be a variable determined based on one or more of the customer's purchase history, the customer's membership status, and the total weight of the items.

In some embodiments, in step 856, the system may display a list of identified items to the user and prompt the user to manually look for any unidentified or misidentified items for scanning. In some embodiments, the user may use a hand scanner to scan the optically readable code on the item to add the item to the identified items list. In some embodiments, the user may be instructed to rearrange the items to give the cameras a different/less obstructed view of the items for CV and/or symbology identification. In some embodiments, identifiers and images captured in step 856 may be used to train a CV model for future product identifications.

After step 856, the expected weight is calculated again in step 850 based on the newly identified item(s). Step 854 also repeats to determine whether the identification passes weight validation and whether the user can proceed to complete the checkout process in step 860. In some embodiments, if a group of items fails weight validation a set number of times, the system may automatically alert a store clerk to provide assistance. In some embodiments, the system may prompt for the entire group of items (e.g. content of the shopping basket) to be rescanned either by a handheld scanner or by placing each item individually in the placement area for CV and/or symbology identification. In some embodiments, the system may instruct the user to remove the items from a shopping container and arrange the items into a single layer in the placement area. The process may then restart from 810 to look for any unaccounted item.

With the process shown in FIG. 8, a group of items clustered together may be individually matched to a corresponding product identifier useful for a purchase transaction without each item needing to be individually scanned by a hand scanner or a scanning bed. The process can lead to significant time reduction for the product identification stage of a checkout process. The CV model is also constantly trained with new data from multiple checkout terminals processing actual purchases to improve the accuracy and confidence of the CV model output.

Figure 9:
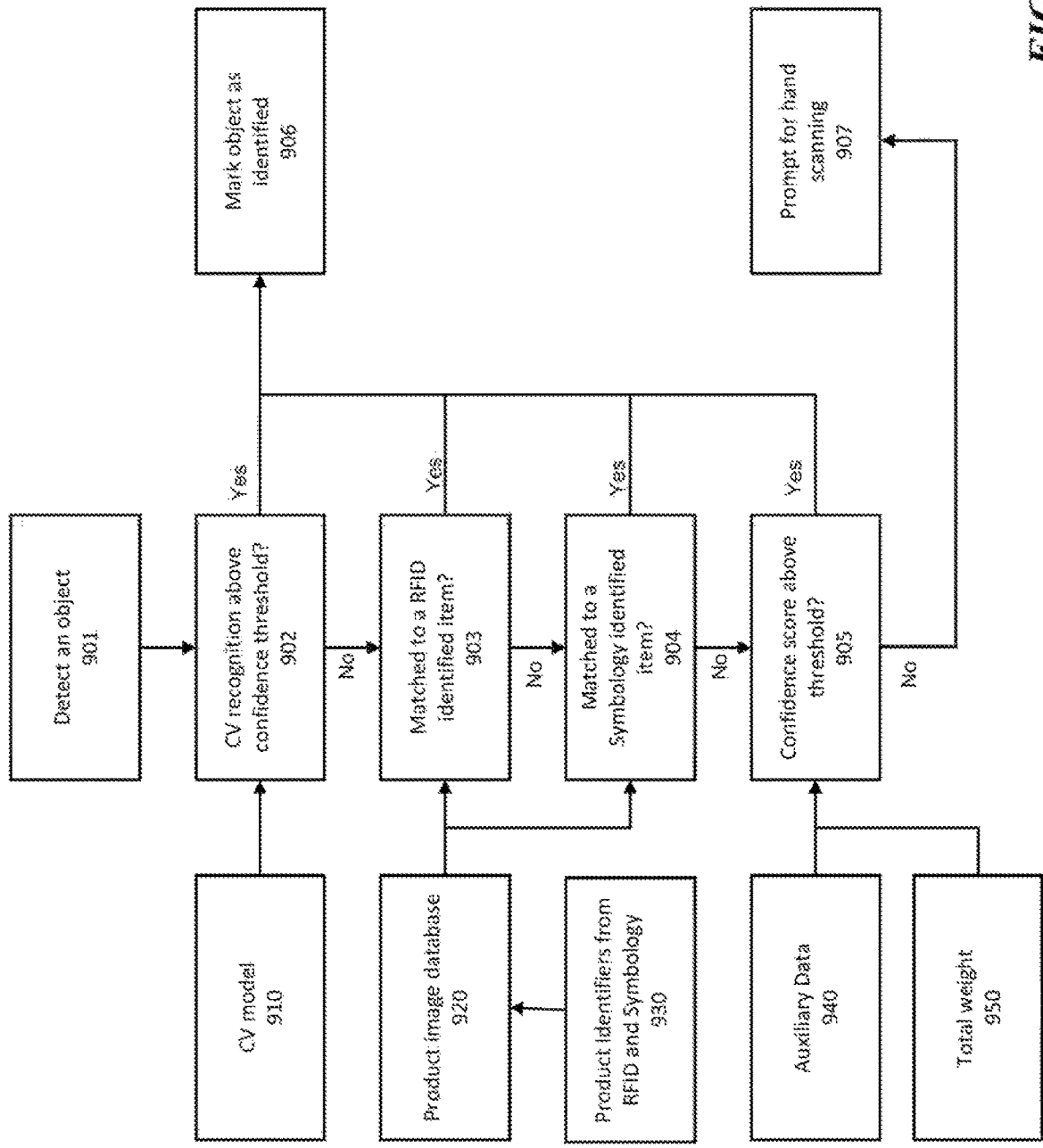
FIG. 9 is a flow diagram of a product identification process in accordance with some embodiments.

Referring next to FIG. 9, an object identification process at a checkout terminal is shown. In some embodiments, the steps shown in FIG. 9 may be performed by a processor-based device such as a control circuit executing a set of computer-readable instructions stored on a computer-readable memory. In some embodiments, one or more steps of FIG. 9 may be performed by the checkout terminal 100 described with reference to FIGS. 1-4 and/or the checkout terminal 600 described with reference to FIG. 6. In some embodiments, one or more steps of FIG. 9 may be performed by one or more of the POS controller 710 and the edge processors 730, 740, and 750 as described with reference to FIG. 7. In some embodiments, the steps of FIG. 9 may be at least partially executed by a central server that exchanges data with a plurality of checkout terminals.

In step 901, the system detects an object in the placement area of a checkout terminal. In some embodiments, the object may be among a group of objects having different product identifiers. An object detection algorithm may determine the boundary of each detected object and generate a listing of temporary object identifiers each assigned to a detected object. In some embodiments, the object may be in a shopping container such as a shopping basket or a shopping tote along with others in the group of objects placed on the checkout terminal. In some embodiments, the object may be detected via CV object detection and identification. In some embodiments, 2D and/or 3D images of the object may be fed through the CV model 910 for product identification. In some embodiments, the CV model may return one or more product identifiers each with an associated confidence threshold.

In step 902, the system determines whether the confidence level of CV identification is above a predetermined threshold. If the confidence level is above the threshold (e.g. 99%, 95%), the system marks the object in the list of detected objects as identified in step 906 and the product identifier determined based on the CV model is used to process the checkout transaction.

If the confidence level from the CV model is below a predetermined threshold, the object is compared to product identifiers determine through RFID and symbology detection. In some embodiments, the checkout terminal may use an RFID reader and cameras to capture RFID tags and symbology markings (e.g. barcode, QR code, product watermarks) on products. Product identifiers collected from RFID and Symbology 930 are used to retrieve product images from a product image database 920. In some embodiments, the images in the product image database 920 may comprise product catalog images, manufacturer-provided images, images retrieved from the web, and the like. In some embodiments, images previously captured by one or more checkout terminals may also be stored in the product image database 920 and used for image similarity comparison.

In step 903, the system determines whether the object matches one of the RFID-identified items based on an AI image similarity analysis algorithm. In some embodiments, the system may require that the object and the retrieved product image pass a similarity threshold as determined by the similarity analysis algorithm. In some embodiments, if multiple objects are not identified by CV product identification in step 902, the object that is the closest image match to an RFID-identified item is selected as a match. If the object is determined to be a match to an RFID-identified item, the object is marked as identified in the list of detected objects in step 906.

In step 904, the system determines whether the object matches one of the symbology-identified items based on an AI image similarity analysis algorithm. In some embodiments, the system may require that the object and the retrieved product image pass a similarity threshold as determined by the similarity analysis algorithm. In some embodiments, if multiple objects are not identified by CV product identification, the object that is the closest image match to a symbology identified item is selected as a match. In some embodiments, the location of the detected symbology is recorded during symbology detection, and the location of the symbology in the placement area may be used in place of or in combination with product image comparison to determine whether there is a match between a CV-unrecognized object and a symbology-identified product. If the object is determined to be a match to a symbology-identified product, the object is marked as identified in the list of detected objects in step 906.

If the object is not a match with a product identifier from RFID or symbology identification, in step 905, the system may determine an adjusted confidence score for the CV object identification. In some embodiments, the confidence score may be determined based on the confidence level from the CV identification in step 902 and score adjustments based on auxiliary data 940 and/or total weight 950. In some embodiments, a customer may provide a customer identifier (e.g. membership card, phone number, mobile wallet scan etc.) to the checkout terminal during the checkout process. In some embodiments, auxiliary data 940 may include customer purchase history retrieved using the customer identifier. An item that was previously purchased by the customer or an item that shares characteristics with items in the customer's purchase history may cause an increase in the confidence score. In some embodiments, the amount of confidence score increase may correspond to the degree of similarity between the CV identification and products in the customer's purchase history. In some embodiments, auxiliary data 940 may include customer demographic information and an item that is consistent with the purchase pattern of the customer's demographic group may lead to an increase of the confidence score. In some embodiments, the auxiliary data may include data from an item scanner attached to a shopping basket or shopping cart. The item scanner may comprise a headless scanner that is configured to record item identifiers (e.g. RFID tag, barcode, QR code, product watermark) from items that are placed into the shopping container. A CV identification that matches an item scanned by the item scanner attached to the shopping container may cause an increase in the confidence score. In some embodiments, auxiliary data may comprise a customer shopping path. In some embodiments, the customer's path inside a retail store may be tracked by a sensor attached to a shopping container or via the customer's mobile device. If a CV identified item's display location is along the customer's shopping path and/or the customer is recorded to have stopped near the display location of the item, the item may receive an increase in confidence score. The types of auxiliary data are described herein as an example only, a checkout system may use various other data as factors in determining the confidence score of a CV product identification.

In some embodiments, the total weight 950 measured by a scale of the checkout terminal may be used for item identification. In some embodiments, the system may determine the difference between the measured weight of the group of items and the calculated weight of the already identified items as the missing weight, and use the missing weight to evaluate the CV identification of the remaining items. For example, if the weight difference is less than the weight of the product identified by CV, the identification may be rejected. In another example, if the weight difference closely matches the weight of the item identified by CV, the confidence score may be increased.

If the confidence score of an object identification exceeds a confidence score threshold in step 905, the object is marked as an identified item in the list of detected objects and the product identifier determined based on the CV model is used to process the checkout transaction. If the object's confidence score does not exceed the confidence score threshold, the system may mark the item as unrecognized and prompt for hand scanning in step 907. The hand scanning process may comprise the process described with reference to step 832 of FIG. 8.

In some embodiments, the CV model 910 and the product image database 920 are networked databases that are shared by any number of checkout terminals in geographically distributed retail stores. In some embodiments, the steps shown in FIG. 9 may be repeated for each object in the placement area of a checkout terminal detected through CV. In some embodiments, steps 902, 903, and 904 of FIG. 9 may occur in any order. For example, the system may match the object to symbology identified products prior to matching it to RFID identified products. In some embodiments, a system may not make use of RFID and/or symbology identification and omit step 903 and/or step 904.

Figure 10:
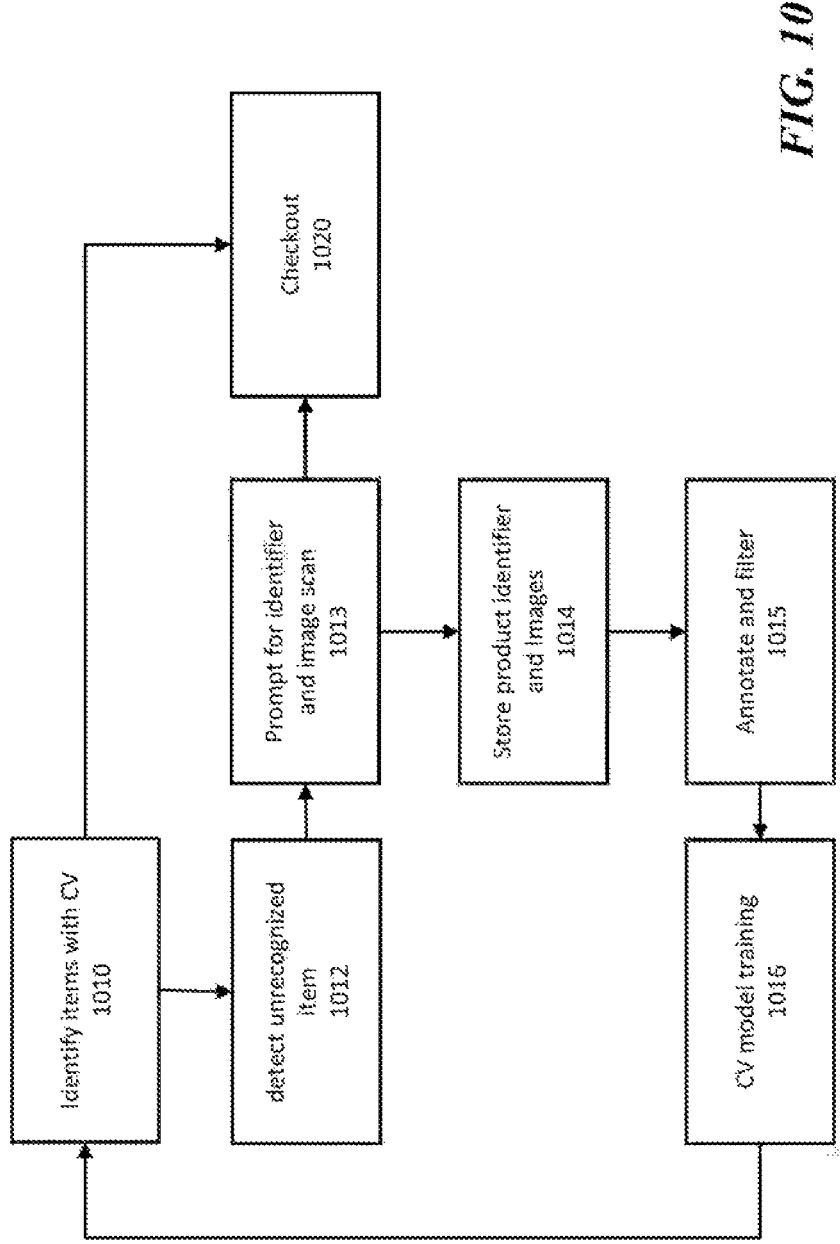
FIG. 10 is a flow diagram of a computer vision training process in accordance with some embodiments.

Referring next to FIG. 10, a method for training a CV model via a checkout terminal is shown. In some embodiments, the steps shown in FIG. 10 may be performed by a processor-based device such as a control circuit executing a set of computer-readable instructions stored on a computer-readable memory. In some embodiments, one or more steps of FIG. 10 may be performed by the checkout terminal 100 described with reference to FIGS. 1-4 and/or the checkout terminal 600 described with reference to FIG. 6. In some embodiments, one or more steps of FIG. 10 may be performed by one or more of the POS controller 710 and the edge processors 730, 740, and 750 as described with reference to FIG. 7. In some embodiments, the steps of FIG. 10 may be at least partially executed by a central server that exchanges data with a plurality of checkout terminals.

In step 1010, a checkout terminal attempts to identify items placed in a placement area with CV. In some embodiments, the items may be a group of different items placed in a shopping container. In some embodiments, the CV algorithm may first identify individual objects in the placement area and then identify each object based on a machine learning trained CV model. In some embodiments, the CV model may comprise an machine learning model based on deep neural network. In some embodiments, step 1010 may comprise step 810 of FIG. 8 or a similar process.

In step 1012, the system detects an unrecognized item among the group of items. In some embodiments, the system may mask each object that is identified through CV or another means (e.g. RFID, symbology) in the captured images. In some embodiments, the system may mark the space occupied by the unrecognized item and/or any unmasked space as a region of interest. In step 1013, the system prompts for a product identifier and image scan by providing instructions to a user via a user interface. In some embodiments, the user may scan an optically readable code to obtain a product identifier and/or move the item for image capture. For example, the system may instruct that the item be removed from the shopping container and placed in a different location of the placement area for image capture. In some embodiments, the product identifier may be captured by the camera array during the image capture and/or through a separate optical hand scanner. In step 1020, the identifier captured in step 1013 and any items identified in step 1010 are used to process the checkout transaction.

In step 1014, the product identifier and images captured in step 1013 are stored to train the CV model used for item identification. In some embodiments, the captured and stored images may comprise 2D and/or 3D images. In step 1015, the stored images are annotated and filtered for quality. In some embodiments, the annotation may be performed manually by a user who selects useful images among the images captured and mark the object within the image for model training. In some embodiments, the annotation may be performed by an automated algorithm that checks for image quality and performs border/edge detection. In some embodiments, the images are further checked for annotation correctness by a human reviewer and/or an algorithm. In step 1016, the annotated and filtered product identifier and the image(s) are used as part of a training data set to train a CV model for product identification. The images may be used as inputs and the product identifier used as the categorizations for training the CV model based on a deep neural network machine learning algorithm. In some embodiments, the CV model is configured to accept images of products and output one or more product identifiers each associated with a confidence level value. In some embodiments, images of CV-identified items in step 1010 may also be used to further train the CV model in a similar process.

With the process described in FIG. 10, data gathered during a checkout process with an actual customer also provides data for a machine learning algorithm that improves future product identifications at checkout terminals across the retail operation. The CV model may be trained on data gathered via any number of geographically distributed retail stores and checkout terminals.

Next referring to FIG. 11, a 3D camera array of a checkout terminal according to some embodiments is shown. A first camera 1110 is mounted on an overhead unit, providing a top-down view 1111 of the placement area. A second camera 1120 is mounted to the vertical support of the overhead unit, providing a top back view 1121 of the placement area. A third camera 1130 is mounted behind a display device at the front of the checkout terminal, providing a front right view 1131 of the placement area. A fourth camera 1140 is mounted behind a display device at the back of the checkout terminal and configured to provide a back left view 1141 of the placement area.

Next referring to FIG. 12, a 2D camera array of a checkout terminal according to some embodiments is shown. A first camera 1250 is mounted on an overhead unit, providing a top-down view 1251 of the placement area. A second camera 1260 is also mounted on the overhead unit, providing another top-down view 1261 of the placement area. The first camera 1250 and the second camera 1260 may have different focal lengths, providing a zoomed-in and a zoomed-out view of the placement area. For example, the first camera may provide a 24" field of view while the second camera may provide a 38" field of view at the same resolution. In some embodiments, cameras 1250 and 1260 may be combined in a single device with an optical zoom lens. A third camera 1270, a fourth camera 1280, a fifth camera 1290, and a sixth camera 1210 are mounted at the four corners of a weight scale of the checkout terminal, providing bottom-up views 1271, 1281, 1291, and 1211 of the placement area from four different angles respectively.

In some embodiments, the number of cameras in the 2D camera array and the 3D camera array of the checkout terminal, and the placement of each camera may vary from those shown in FIGS. 11 and 12.

Referring now to the drawings, in FIGS. 13-17, views of a checkout terminal 100B according to some embodiments are shown. The checkout terminal 100B is a variation of the checkout terminal 100 wherein the same part numbers generally refer to the same or similar components except as described herein. FIG. 13 comprises a top front perspective view, FIG. 14 comprises a bottom rear perspective view, FIG. 16A comprises a left side view, FIG. 16B comprises a right-side view, and FIG. 17B comprises a top plan view of the checkout terminal 100B. The same reference numbers in FIGS. 13-17 generally refer to the same parts in each figure.

The checkout terminal 100B is a point-of-sale system in a retail environment that identifies items for checkout transactions and facilitates the processing of the purchase of the items. The checkout terminal 100B may be a store employee-operated terminal or a customer self-checkout terminal. The checkout terminal 100B comprises a platform portion 110, a scale module 120, a first display device 131, a second display device 141, a first camera support 162, a second camera support 161, and an overhead unit 150.

The scale module 120 includes a top surface comprising a placement area on which products may be placed for identification during a checkout process. A grouping of different products may be placed on the scale module 120 in a shopping container such as a shopping basket or a tote. The scale module 120 includes one or more load cells for measuring the total weight of items placed on the weight scale. The scale module 120 may further include an RFID reader (not shown) integrated under the surface that is configured to detect RFID tags on products in the placement area. In some embodiments, the scale module 120, along with the integrated RFID reader may comprise a removable module that can be removed and replaced as a unit.

The display device 131 may display identified item information and information associated with the purchase transaction. For example, the display screen may display names and quantities of items as they are identified such that a user may verify the product identification and select to proceed to pay for the purchase of the items. In some embodiments, the display device 131 may comprise a touch screen configured to accept user input. The card reader 132 is mounted next to the display device 131 and configured to accept payment (e.g. credit card, debit card, mobile wallet payment, Near Field Communication (NFC) payment) for checkout transactions. A handheld optical scanner 135 is provided for scanning products left in a shopping cart and/or not identified via the camera system of the checkout terminal 100B. A receipt printer 111 is positioned next to the display device 131. In some embodiments, the receipt printer 111 may comprise a removable module that can be removed and replaced as a unit.

The overhead unit 150 is connected to the platform portion 110 and supported by a vertical support 159. The overhead unit 150 includes a light source 151, a 3D camera 152, two 2D cameras 153 and 154, and an indicator light 156. The light source 151 may be configured to affect the lighting condition of objects placed in the placement area to enhance images captured by the cameras of the system. A 3D camera 158 is positioned on the vertical support 159 and configured to capture 3D images of products placed in the placement area from a top back view. A second display device 141 is also mounted on the vertical support 159. The display device 141 may be configured to display item scanning instructions, such as instructions to lift an item for scanning or weighting. In some embodiments, the display device 141 may display real-time images captured by one of the cameras of the checkout terminal, and the item associated with the instruction may be marked or highlighted in the image. In some embodiments, the display device 141 may comprise a touch screen configured to accept user input relating to item identification.

A first camera support 161 is positioned to the right of the placement area over the scale module 120. The first camera support 161 includes a 3D camera 133 and two 2D cameras 123 and 124 for capturing images of products placed in the placement area from the back right angle. In some embodiment, the two 2D cameras 123 and 124 may be positioned next to each other but angled to have different fields of view and/or focal lengths. A second camera support 162 is positioned to the left of the placement area over the scale module 120. The second camera support 162 includes a 3D camera 142 and two 2D cameras 121 and 122 for capturing images of products placed in the placement area from the back left angle. In some embodiment, the two 2D cameras 121 and 122 may have different fields of view and/or focal lengths. In some embodiments, the first camera support 151 and the second camera support 152 may each be a modular unit that may be removed and replaced as a unit, along with the cameras mounted in the support.

In the embodiment shown in FIGS. 14-17, the checkout terminal 100B includes four 3D cameras 133, 142, 152, and 158 which may be collectively referred to as a 3D camera array. The four 3D cameras are positioned around the placement area to provide different fields of view of the placement area of the checkout terminal. The checkout terminal 100B further includes six 2D cameras 121, 122, 123, 124, 153, and 154 which may be collectively referred to as a 2D camera array. The six 2D cameras are positioned around the placement area to provide different fields of view and/or focal lengths of the placement area of the checkout terminal. The number of cameras in the 2D camera array and the 3D camera array of the checkout terminal may vary for different embodiments. In some embodiments, the placements and positions of cameras and other components of the checkout terminal may also vary without departing from the spirit of the present disclosure.

The platform portion 110 includes a housing for some internal components of the checkout terminal 100 and includes a guard 114 for protecting the checkout terminal 100B from impacts with persons and shopping carts. The platform portion 110 includes a bagging area 170 that is lower compared to the placement area. The bagging area 170 may optionally include bag holders 171 for holder store-provided or customer-provided bags or totes. A set of wheels 173 are attached to the bottom of the checkout terminal 100B to provide mobility to the checkout terminal 100B.

In some embodiments, the techniques described herein relate to a checkout terminal system including: a camera array; a display device; a weight scale; and a control circuit coupled to the camera array, the display device, and the weight scale, the control circuit being configured to: identify, based at least on images captured by the camera array, product identifiers associated with a plurality of different items placed in a placement area of the weight scale; determine a combined weight of the plurality of different items based on item weight information stored in a product database; retrieve a weight measurement from by the weight scale; detect for unaccounted items based on comparing the combined weight the plurality of different items and the weight measurement; and in the event that an unaccounted item is detected, display, via the display device, instructions to move one or more items to identify the unaccounted item.

In some embodiments, the techniques described herein relate to a retail checkout method including: identifying, at a control circuit and based at least on images captured by a camera array of a checkout terminal, product identifiers associated with a plurality of different items placed in a placement area of a weight scale of the checkout terminal; determining, at the control circuit, a combined weight of the plurality of different items based on item weight information stored in a product database; retrieving a weight measurement from by the weight scale; detecting, by the control circuit, for unaccounted items based on comparing the combined weight the plurality of different items and the weight measurement; and in the event that an unaccounted item is detected, displaying, via a display device of the checkout terminal, instructions to move one or more items to identify the unaccounted item.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A checkout terminal system comprising:
    a camera array;
    a display device;
    a weight scale; and
    a control circuit coupled to the camera array, the display device, and the weight scale, the control circuit being configured to:
        identify, based at least on images captured by the camera array, product identifiers associated with a plurality of different items placed in a placement area of the weight scale;
        identify an item in the plurality of different items as a variable weight item;
        cause the display device to display instructions to lift the variable weight item;
        determine a weight of the variable weight item based on a change in a total weight on the weight scale when the variable weight item is lifted;
        determine a cost of the variable weight item based on the weight;
        determine a combined weight of the plurality of different items based on item weight information stored in a product database;
        retrieve a weight measurement of items in the placement area from the weight scale;
        detect for unaccounted items in the placement area based on comparing the combined weight of the plurality of different items and the weight measurement of items in the placement area;
        in the event that an unaccounted item is detected in the placement area, display, via the display device and while the items are in the placement area, instructions to move one or more items in the placement area; and
        identify, based on at least additional images captured by the camera array, the unaccounted item.

2. The system of claim 1, wherein the camera array comprises a plurality of 2D cameras and a plurality of depth cameras providing different fields of view around the placement area.

3. The system of claim 1, wherein the camera array comprises a plurality of cameras embedded in the weight scale.

4. The system of claim 1, further comprising:
a first camera support housing a first depth camera, a first 2D cameras, and a second 2D camera of the camera array.

5. The system of claim 4, further comprising:
a second camera support housing a second depth camera, a third 2D cameras, and a fourth 2D camera of the camera array.

6. The system of claim 1, further comprising:
a Radio Frequency Identification (RFID) reader embedded in the weight scale,
wherein a subset of the plurality of different items is identified via the RFID reader.

7. The system of claim 1, wherein a subset of the plurality of different items are identified based on detecting optically readable codes on items in images captured by the camera array.

8. The system of claim 1, wherein a subset of the plurality of different items are identified via a machine learning algorithm based on a computer vision model trained on images captured at a plurality of checkout terminals.

9. The system of claim 8, wherein the images captured by the camera array and identifiers associated with the plurality of different items are used to train the computer vision model for future identifications.

10. The system of claim 1, further comprising:
an overhead unit positioned over the weight scale, the overhead unit comprises one or more cameras of the camera array.

11. The system of claim 1, further comprising:
a light source over the weight scale, wherein the control circuit is configured to control the light source to adjust a lighting condition of the plurality of different items placed on the weight scale.

12. The system of claim 1, further comprising:
a second display device;
wherein the control circuit is configured to cause information associated with identified items to be displayed on the second display device.

13. The system of claim 1, further comprising:
a card reader configured to accept payment for a purchase of the plurality of different items.

14. A retail checkout method comprising:
identifying, at a control circuit and based at least on images captured by a camera array of a checkout terminal, product identifiers associated with a plurality of different items placed in a placement area of a weight scale of the checkout terminal;
identifying an item in the plurality of different items as a variable weight item;
causing a display device to display instructions to lift the variable weight item;
determining, by the control circuit, a weight of the variable weight item based on a change in a total weight on the weight scale when the variable weight item is lifted;
determining, by the control circuit, a cost of the variable weight item based on the weight;
determining, at the control circuit, a combined weight of the plurality of different items based on item weight information stored in a product database;
retrieving, by the control circuit, a weight measurement of items in the placement area from the weight scale;
detecting, by the control circuit, for unaccounted items in the placement area based on comparing the combined weight of the plurality of different items and the weight measurement of items in the placement area;
in the event that an unaccounted item is detected in the placement area, displaying, via the display device of the checkout terminal and while the items are in the placement area, instructions to move one or more items in the placement area; and
identifying, based on at least additional images captured by the camera array, the unaccounted item.

15. The method of claim 14, wherein the camera array comprises a plurality of 2D cameras and a plurality of depth cameras providing different fields of view around the placement area.

16. The method of claim 14, wherein the camera array comprises a plurality of cameras embedded in the weight scale.

17. The method of claim 14, further comprising:
wherein a subset of the plurality of different items is identified via a Radio Frequency Identification (RFID) reader embedded in the weight scale.

18. The method of claim 14, wherein a subset of the plurality of different items are identified based on detecting optically readable codes on items in images captured by the camera array.

19. The method of claim 14, wherein a subset of the plurality of different items are identified via a machine learning algorithm based on a computer vision model trained on images captured at a plurality of checkout terminals.

20. The method of claim 19, wherein the images captured by the camera array and identifiers associated with the plurality of different items are used to train the computer vision model for future identifications.

* * * * *